(12) United States Patent
Wakashiro et al.

(10) Patent No.: US 6,366,059 B1
(45) Date of Patent: Apr. 2, 2002

(54) CONTROL SYSTEM FOR HYBRID VEHICLE

(75) Inventors: Teruo Wakashiro; Takashi Iwamoto; Shinichi Kitajima; Shigetaka Kuroda; Kazutomo Sawamura; Atsushi Matsubara, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/628,165

(22) Filed: Jul. 28, 2000

(30) Foreign Application Priority Data

Jul. 30, 1999 (JP) .......................................... 11-218219

(51) Int. Cl.$^7$ .............................. H02P 9/00; B60K 6/04
(52) U.S. Cl. ........................ 322/16; 290/40 C; 180/65.2
(58) Field of Search ............................. 322/15, 16, 37; 290/40 C; 180/65.2

(56) References Cited

U.S. PATENT DOCUMENTS

| | | | | |
|---|---|---|---|---|
| 5,343,970 A | * | 9/1994 | Severinsky | 180/65.2 |
| 5,846,155 A | * | 12/1998 | Taniguchi et al. | 477/2 |
| 6,237,709 B1 | * | 5/2001 | Chubachi | 180/65.2 |
| 6,269,290 B1 | * | 7/2001 | Egami et al. | 701/22 |
| 6,295,487 B1 | * | 9/2001 | Ono et al. | 701/22 |
| 2001/0019210 A1 | * | 9/2001 | Fukasaku et al. | 290/40 C |
| 2001/0034572 A1 | * | 10/2001 | Yamaguchi et al. | 701/22 |

* cited by examiner

*Primary Examiner*—Nicholas Ponomarenko
(74) *Attorney, Agent, or Firm*—Armstrong, Westerman & Hattori, LLP

(57) ABSTRACT

A control apparatus of a hybrid vehicle is provided, capable of charging the storage battery, when the residual capacity of the storage battery is decreasing and when a predetermined amount of the initial residual capacity is decreased. The control apparatus of the present invention comprises a initial residual capacity comparison means S058 for comparing the initial capacity of the storage battery with the discharge depth limiting initial lower limit; a lower limit threshold value setting means S060 and an upper limit setting means S061 for setting the lower limit threshold value and the upper limit threshold value for the discharge amount from the initial residual capacity; a motor control changing means S054 for changing the control mode of the motor when the residual capacity of the storage battery reaches the upper limit threshold value; and a mode setting release means S062 for releasing the setting of the motor control mode set by the motor control changing means when the residual capacity of the storage battery reaches the lower limit threshold value; wherein the control apparatus further comprises a initial residual capacity setting means S059 for assigning the lower limit initial residual capacity to the initial residual capacity when it is determined by the initial residual capacity comparison means that the initial residual capacity of the storage battery is lower than the lower limit initial residual capacity.

6 Claims, 17 Drawing Sheets

CONTROL SYSTEM FOR HYBRID VEHICLE

BACKGROUND OF THE INVENTION

1. Field of the Invention

The present invention relates to a control system for a hybrid vehicle driven by an engine and a motor, and more particularly, relates to a control system, capable of recovering a charge and discharge balance during travelling when the charge and discharge balance of the storage battery is tend to converted to the over discharge state.

2. Background Art

Conventionally, a hybrid vehicle provided with a power source consisting of a motor in addition to an engine is known. There are two types of hybrid vehicles, one is series hybrid vehicles and the other is parallel hybrid vehicles. The series hybrid vehicles are driven by motors which are driven by an output of a generator driven by the engine.

Thus, disconnection of the mechanical coupling between the engine and the vehicle wheel allows constant rotation of the engine at high gas oil ratio and low emission, and better gas oil ratio and lower emission can be obtained than the case of the conventional engine.

In contrast, in the parallel hybrid vehicles, a motor directly connected with the engine assists the engine for rotating the drive shaft, and the motor is used as a generator for charging the electric energy into the storage battery.

Thus, in the parallel hybrid vehicles, irrespective of the presence of the mechanical connection between the engine and the wheels, a better gas oil ratio and lower emission can be obtained.

There are a few types in the above-described parallel hybrid vehicles, one is a type, in which a motor, directly coupled with the engine output axis for supporting the engine output, charges the battery at the time of deceleration functioning as a generator, and the other is a type, in which both or either one of the engine and the motor can generates the driving force and the generator is additionally provided.

In the hybrid vehicles shown above, the demands of the driver can be satisfied by preserving the electric energy of the battery (hereinafter called the residual capacity) by vehiclerying out a variety of controls such that the motor assists the engine at the time of accelerating and, at the time of deceleration, the motor charges the battery by deceleration regeneration. Fr example, since a large quantity of deceleration regeneration can be obtained after the high speed travelling, the battery can retrieve a part of the consumed energy at the time of deceleration. After climbing up the mountain path, the battery can be charged afterward at the time of travelling the downhill (disclosed in Japanese Patent Application, First Publication).

However, in the above-described conventional hybrid vehicles, there are many cases, in which preservation of the deceleration regeneration is not possible, such as driving in a rapid acceleration followed by a rapid acceleration interposing a short deceleration or driving a level ground after climbing the mountain path. A problem arises that, in the former case, insufficient regeneration causes the reduction of the battery capacity during travelling, and in the latter case, the excessive battery capacity consumed in the climbing path can not be retrieved, as far as the downhill driving is not implemented.

SUMMARY OF THE INVENTION

It is therefore an objective of the present invention to provide a control system for hybrid vehicles capable of charging the battery when the residual capacity of the storage battery is tend to decrease and a predetermined value of the residual capacity has decreased from the initial read value.

The present invention according to the first aspect provide a control apparatus for a hybrid vehicle which comprises an engine for outputting a driving force of the vehicle, a motor for generating an auxiliary driving force for assisting the engine power in response to the driving condition of the vehicle, and a storage battery for storing a regenerative energy obtained by a regenerative operation of the motor at the time of supplying electric power to the motor or at the time of reducing speed of the vehicle; the control apparatus of the above-described hybrid vehicle comprises: a travel start detecting device for detecting a travel start of the vehicle; a residual capacity detecting device for detecting a residual capacity of the storage battery; an initial residual capacity comparison device for comparison of the initial residual capacity with the lower limit initial residual capacity; a lower limit threshold value setting device for setting the lower limit threshold value of the discharge quantity for said initial residual capacity; a lower limit threshold value setting device for setting the lower limit threshold value of the discharge quantity for said initial residual capacity; an upper limit threshold value setting device for setting the upper limit threshold value of the discharge quantity for said initial residual capacity; a motor control changing device for changing the control of said motor when the residual capacity of the storage battery reduces to said lower limit threshold value; and a mode setting release device for releasing the setting of the motor control mode changed by said motor control changing device when the residual capacity of the storage battery reaches said upper limit threshold value; said control apparatus further comprises: an initial residual capacity setting device for setting the initial value by assigning the lower limit initial residual value to the initial residual value when it is determined by said initial residual capacity comparison device that the initial residual capacity is lower than the lower limit threshold value.

Provision of the control apparatus of the hybrid vehicle according to the first aspect of the present invention allows to restore the residual capacity of the storage battery when it is detected that the residual capacity of the storage battery is decreased at a predetermined amount, caused by travelling without being able to acquiring sufficient regeneration energy by repeating rapid acceleration and deceleration or by travelling repeated cycles of uphill and flat without being able restoring the residual capacity of the storage battery because the reduced residual capacity caused by going uphill can not be recovered by traveling the flat.

Furthermore, according to the first aspect, since it is possible to raise the initial residual capacity by assigning the lower limit initial value for the initial residual capacity when the initial residual capacity is less than the lower limit initial value, and since the discrepancy of the initial residual capacity from the lower limit threshold value, the timing to change the control mode of the motor can be executed earlier by the motor control changing device which results in rapid restoration of the residual capacity of the storage battery.

In the control apparatus of the hybrid vehicle according to the first aspect, said control apparatus further comprises an initial value updating device for updating the upper limit threshold value and the lower limit threshold value in response to the updating the initial residual capacity by the residual capacity detected by the residual capacity detecting device when the motor control mode is released by said mode setting release device.

The structure of the control apparatus as shown above allows to update the residual capacity of the storage battery detected by the residual capacity detecting device when the residual capacity reaches the upper limit threshold value, and also allows to update the upper limit threshold value and the lower limit threshold value by the upper and lower limit threshold value setting device.

In the control apparatus of the hybrid vehicle according to the second aspect, the control apparatus further comprises an upper value comparison device for comparing the residual capacity of said storage battery with a discharge depth limiting execution upper limit, and the motor control mode is released by said mode setting release device when said upper value comparison device detects that the residual capacity of the storage battery is higher than the discharge depth limiting execution upper limit.

The above-described structure according to the third aspect allows to release the control mode of the motor rapidly, when the residual capacity of the storage battery has been restored sufficiently.

In the control apparatus of the hybrid vehicle according to any one of the first to third aspects, the change of the motor control in the case of decreasing the residual capacity of the storage battery to said lower limit threshold value corresponds to an increase of the charge quantity of the storage battery and to a change of the judgement threshold value for assisting the engine power by the motor.

The above structure allows increasing the charging amount during the cruise traveling, and increasing the frequency of the generation for recovering the discharging and charging balance by changing the assist judgement threshold value.

DETAILED DESCRIPTION OF THE INVENTION

Hereinafter, preferred embodiments of the present invention will be described with reference to the attached drawings.

Figure 1:
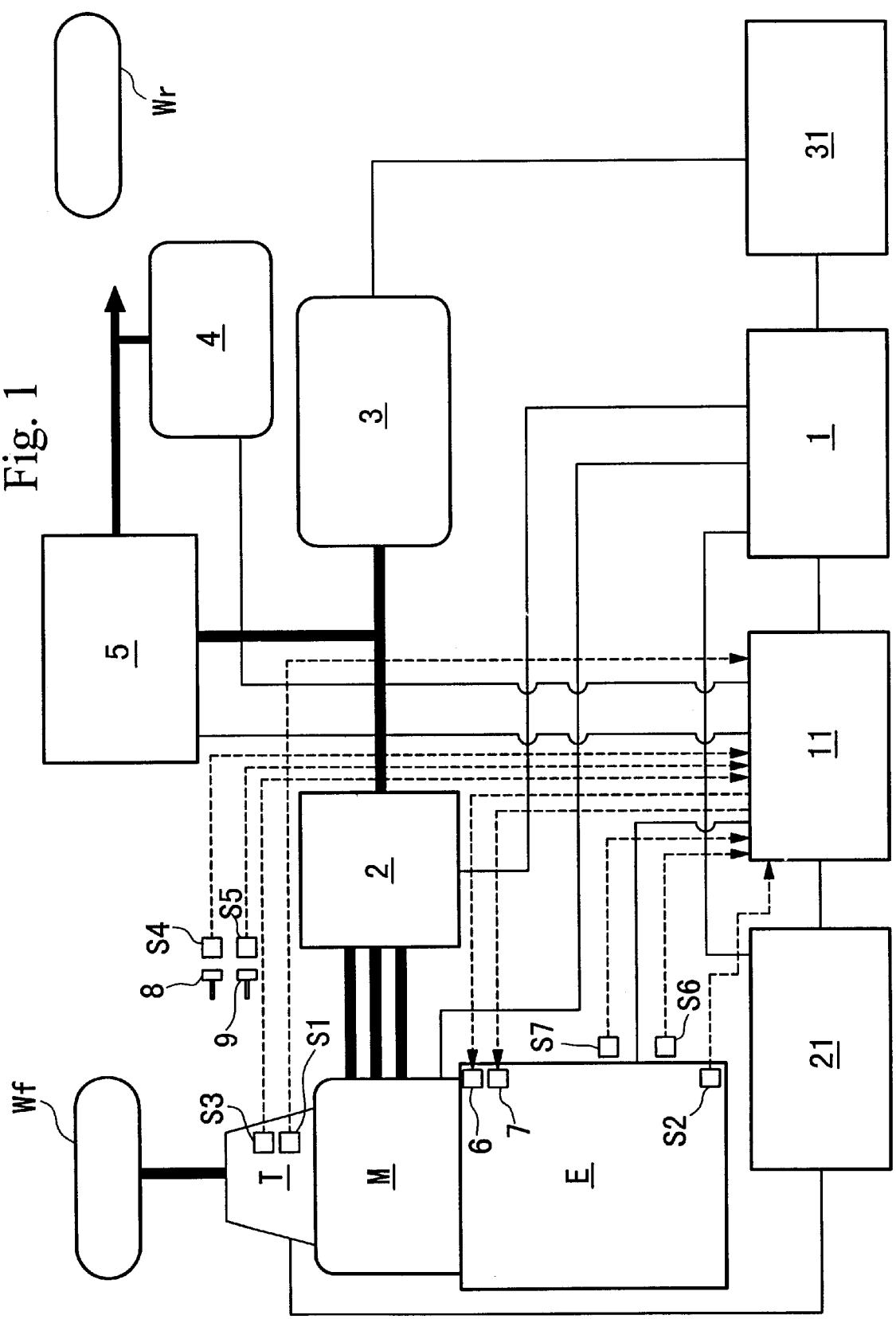
FIG. 1 is a diagram showing the entire structure of a hybrid vehicle.

FIG. 1 shows an embodiment suitable for the parallel hybrid vehicles, and the driving force generated both by an engine E and a motor M is transmitted to the front wheels Wf and Wf which constitutes the drive wheel through the transmission T consisting of an automatic transmission or a manual transmission. When the driving force is transmitted from the front wheels Wf and Wf to the motor M at the time of deceleration, the motor M functions as an generator for generating so-called regenerative braking force and the kinetic energy of the vehicle body is recovered by the electric energy.

The drive and the regenerative operation are vehicleried out by a power drive unit 2 when receiving control orders from a control motor ECU1. The power drive unit 2 is connected with a high voltage-type battery 3 for exchanging electric energy with the motor M. The battery is constituted by a plurality of module units, each constituted by serially connecting a plurality of cells. In the hybrid vehicles, four 12 volts auxiliary batteries 4 are installed in order to drive various accessories and the auxiliary batteries 4 is connected with the battery 3 through a downverter 5. The downverter 5 controlled by FIECU11 reduces the voltage of the battery 3 and charges the auxiliary batteries 4.

FIECU11 controls actuation of a fuel supply quantity control device for controlling the fuel supply quantity to the engine E, actuation of the starter motor and the timing of ignition in addition to control of the above-described motor ECU 1 and the above downverter 5. In order to vehiclery out those control, various signals are input into FIECU11. Various signals includes a signal from a vehicle speed sensor S1 for detecting the vehicle speed V based on a number of revolutions of the driving shaft of the transmission, a signal from an engine revolution number sensor S2 for detecting the engine revolution number NE, a signal from the shift position sensor S3 for detecting a shift position of the transmission T, a signal from a brake switch S4 for detecting a brake pedal operation, a signal from a clutch switch S5 for detecting the clutch pedal operation, a signal from a throttle opening sensor S6 for detecting the throttle opening TH, and a signal from the suction pipe depression sensor S7 for detecting the suction pipe depression PB.

Here, in FIG. 1, the numeral 21 denotes CVTECU for controlling CVT, and 31 denotes a battery ECU used for protecting the battery 3 and calculating the residual capacity SOC of the battery 3.

There are several control modes for controlling the hybrid vehicles, such as "idle stop mode", "idle mode", "deceleration mode", "acceleration mode", and "cruise mode".

{Motor operation mode identification}

Figure 2:
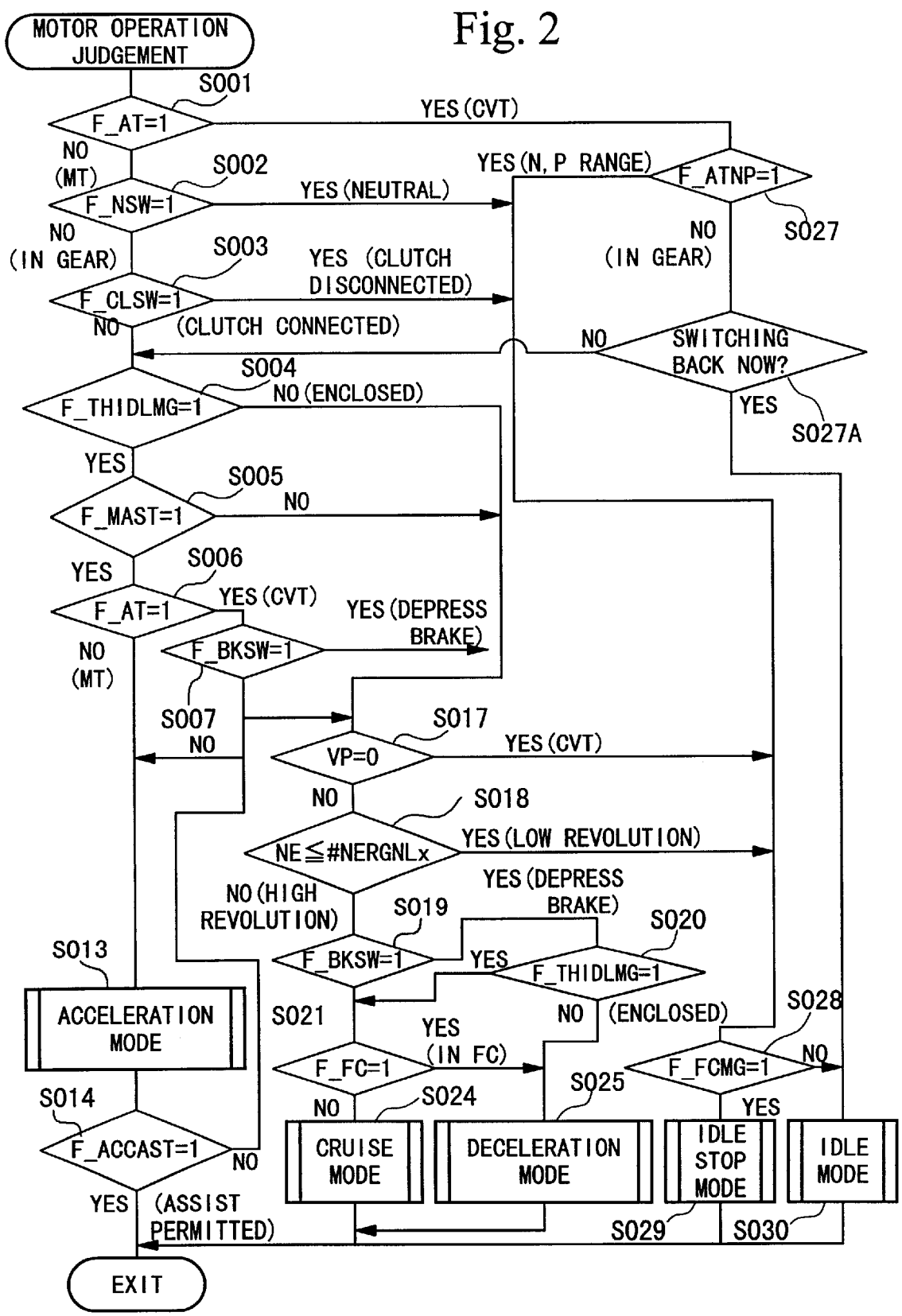
FIG. 2 is a flow-chart showing the mode judgement of a motor operation.

A motor operation modes identification is described based on the flow-chart shown in FIG. 2.

In step S001, a judgement is made whether or not a flag value of the MT/CVT judgement flag is "1". When the result of the judgement is "NO", that is, when the result of the judgement shows that the vehicle is a MT (Manual Transmission) vehicle, the routine goes to the step S002. When the result of the judgement in step S001 is "YES", that is, the vehicle is the CVT (Continuously Variable Transmission) vehicle, then the routine goes to step S027 and a judgement is made whether or not the flag value of the CVT in-gear judgement flag F_ATNP is "1". If the result of the judgement in step S027 is "NO", that is, the vehicle is an in-gear state, the further judgement is made in step S027A whether or not the vehicle is in a switch back operation (operating the shift lever). If the result of the judgement in step S027A is "NO", that is, the vehicle is not in the switch back operation, the routine goes to step S004. If the result of the judgement in step S027A is "YES", that is the vehicle is in the switch back operation, then the routine goes to step S030 and the operation is converted into the "idle mode" for completing the operation control. In the idle mode, the fuel supply is started again after the fuel supply stop for maintaining the engine e at the idling state.

In contrast, when the result of the judgement in step S027 is "YES", that is, when the vehicle is in N and P range, the routine goes to step S028 and further judgement is made whether or not the flag value of the engine stop control implement flag F_FCMG flag is "1". If the result in step S028 is "NO", the routine goes to step S030 for converting the engine into the "idle mode" and the routine is completed. If the judgement determines that the flag value is "1" in step S028, the routine goes to step S029 for converting the engine into the "idle mode", and the control is completed. In "the idle stop mode", the engine is stopped under a certain condition such as the vehicle stop.

In step S002, a judgement is made whether or not the flag value of the neutral position judgement flag F_NSW is "1". When the result of the judgement in step S002 is "YES", that is, when the clutch is in the neutral position, then the routine goes to step S028. When the result of the judgement in step S002 is "NO", that is, when the clutch is in gear, the routine goes to step S003 and further judgement is made whether or not a value of the clutch connection judgement flag F_CLSW is "1". If the result is "YES" and the clutch is "disconnect", the routine goes to step S028. If the result in step S003 is "NO" and the clutch is "connect", the routine goes to step S004.

In step S004, a judgement is made whether or not the flag value of the flag F_THIDLING is "1". When the result is "NO", that is, when the throttle is in the enclosed state, the routine goes to step S017. When the result in step S004 is "YES", that is, when the throttle is not enclosed, the routine goes to step S005 for judging whether or not the flag value of the flag F_MAST is "1".

If the result in step S005 is "NO", the routine goes to step S017. If the result in step S005 is "YES", the routine goes to step S006.

In step S006, a judgement is made whether or not the flag value of the MT/CVT judgement flag F_AT is "1". When the result is "NO", that is, the vehicle is the MT vehicle, the routine goes to step S013, the "acceleration mode". When the results in step S006 is "YES", that is, when the vehicle is the CVT vehicle, the routine goes to step S007 for judging whether or not the flag value of the brake-ON judgement flag F_BKSW is "1". When the result in step S007 is "YES", that is, when it is determined that the brake is depressed, the routine goes to step S017. When the result in step S007 is "NO", that is, when the brake is not depressed, the routine goes to step S013.

After the acceleration mode is attained in step S013, a judgement is made whether or not the assist permission flag F_ACCAST is "1". When the result is "YES", the routine is complete. When the result in step S014 is "NO", the routine goes to step S017.

In step S017, a judgement is made whether or not the vehicle speed VP for engine control is "0". When this result is "YES", that is, when the car speed is zero, the routine goes to step S018.

In step S018, a comparison is made between the engine revolution number NE and the cruise/deceleration mode lower limit engine revolution number #NERGNLx. x in the cruise/deceleration mode lower limit engine revolution number #NERGNLx represents a predetermined value for each gear position (including hysteresis).

When the result of the judgement in step S018 indicates the engine revolution number≦cruise/deceleration mode lowest limit engine revolution number #NERGNLx, that is, the engine speed is in the lower revolution range, the routine goes to step S208. In contrast, is the results in step S018 indicates that the engine revolution number>cruise/deceleration mode lowest limit engine revolution number #NERGNLx, that is, the engine speed is in the higher revolution range, the routine goes to step S019.

In step S019, a judgement is made whether or not the flag value of the brake On judgement flag F_BKSW is "1". When the result in step S019 is "YES", that is when the brake is depressed, the routine goes to step S020. If the result in step S019 is "NO", that is, when the brake is not depressed, the routine goes to step S021.

In step S020, a judgement is made whether or not the IDLE judgement flag F_THIDLMG is "1". When the result is "NO", that is, when the throttle is enclosed, the routine goes to the "deceleration mode" and the control is completed. In the "deceleration mode", the regenerative braking by the motor M is executed. When the result in step S020 is "YES", that is, the throttle is not enclosed, then the routine goes to step S021.

In step S021, a judgement is made whether the flag value of the fuel cut implement flag F_FC is "1". When the result is "YES", that is, the fuel cut is executed, the routine goes to step S025, and when the result of step S021 is "NO", the routine goes to the "cruise mode". In the "cruise mode", the motor is not driven and the vehicle travels by the driving force generated by the engine E.

{Zoning of the residual capacity SOC of the battery}

Next, zoning of the residual capacity of the battery (so called zone dividing of the residual capacity) will be described. The calculation of the residual capacity of the battery is carried out by the battery ECU 31, based on, for example, the voltage, the discharge current, and the temperature.

An example of the calculation is described. Below the normally operating zone, A zone (from 40% SOC to 80 to 90% SOC), an interim operating zone, B zone (20% SOC to 40% SOC) is defined, and further below the interim use zone, the over discharge zone, C zone (0% SOC to 20% SOC) is defined. Above the zone A, an overcharge zone D (80 to 90% SOC to 100% SOC) is defined. The detection of the battery residual capacity SOC is executed by the estimation of the current values in zones A and B, and, from the characteristics of the battery, the voltage of the battery is used for the detection of the residual capacity in zones C and D.

Furthermore, a threshold values are determined for the upper and lower limits of each zone, and a hysteresis is provided by setting different threshold values depending on the situation whether the residual capacity of the battery SOC is increasing or decreasing.

Here, when a record of the battery residual capacity SOC is reset by replacement of the battery and the residual capacity SOC can not be calculated, the drive control is executed mainly for charging the battery, assuming the initial value of SOC is 20%, which is the border between the zone C and the D zone and intending to increase the residual value up to more than 20% in addition to the assumed initial value of 20%. Thereby, when the actual residual capacity SOC is in the B zone, the residual capacity SOC is resulted entering in the A zone, in which the drive control towards increasing the residual capacity continues or is ceased by being detected by the voltage that the residual capacity is entering into the D zone. Thus, the actual residual capacity of the battery SOC at present is now detected.

{Discharge depth limit judgement}

Figure 3:
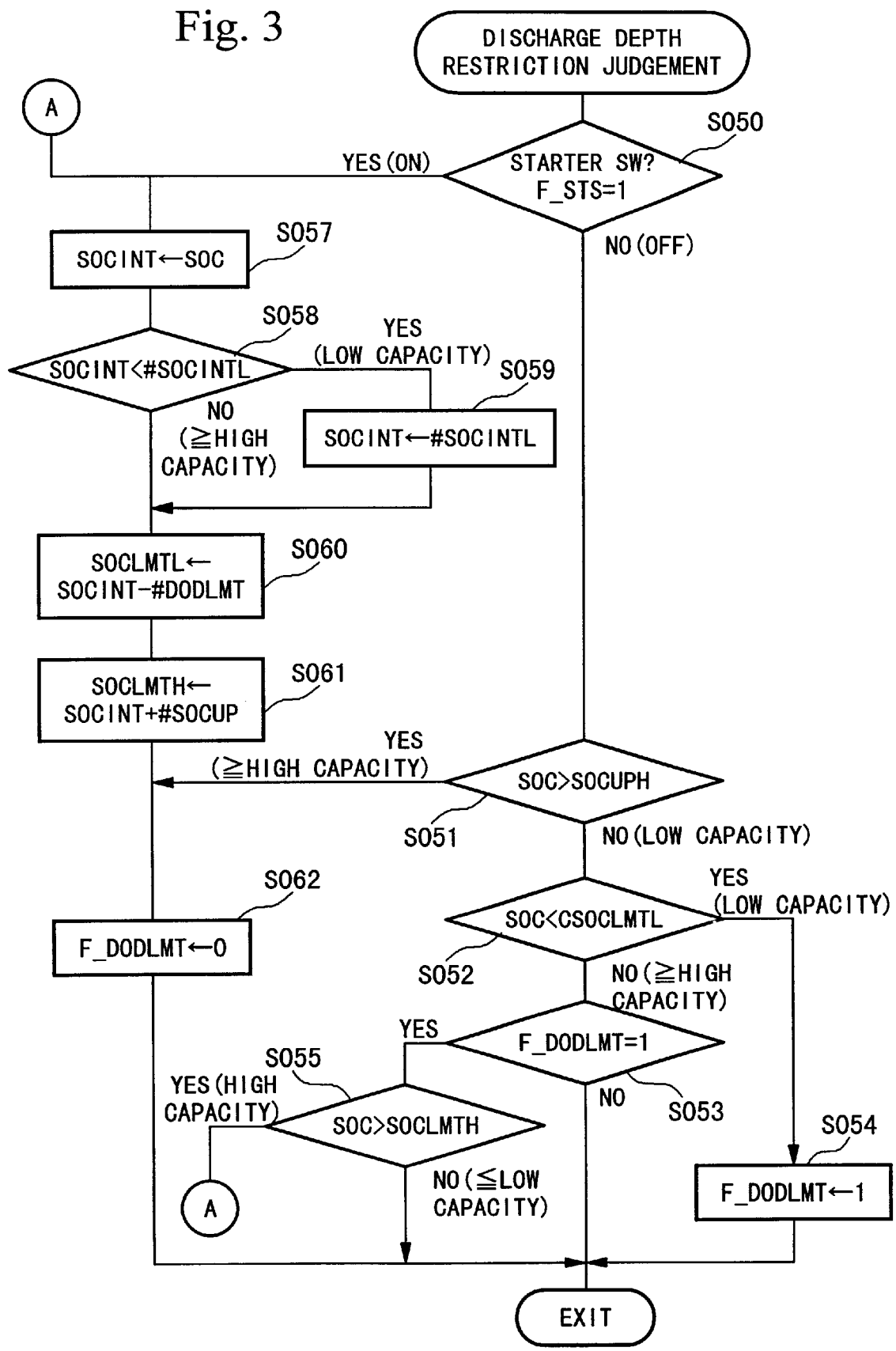
FIG. 3 is a flow-chart showing the discharge depth limit judgement.

FIG. 3 is a diagram showing a flow chart for making a discharge depth limit judgement.

First, in step S050, a judgement is made whether or not the flag value of a start switch judgement flag F_STS is "1", that is, whether this is the starting time of the first travel. When the result is "1", that is, when it is determined that this is the first travel, the initial value SOCINT of the battery residual capacity SOC at the start time of the travel is read in step S057. In step S058, a judgement is made whether or not the initial value SOCINT of the battery residual capacity SOC is less than a discharge depth limit initial limit value #SOCINTL. The discharge depth limit initial limit value #SOCINTL is, for example, 50%.

When the judgement result in step S058 is "YES", that is, the initial value SOCINT of the battery residual capacity SOC is less than the discharge depth limit initial limit value #SOCINTL (that is, the capacity is low), the routine goes to step S059, and after substituting the discharge depth limit initial limit value #SOCINTL as the initial value of the battery residual capacity SOC and the routine goes to step S060. That is, when the discharge depth limit initial limit value #SOCINTL is assumed to be 50%, if the actual battery residual vale is less than 50%, then 50% is assigned to the initial value of the battery residual capacity.

If the judgement result in step S058 is "NO", that is, when it is determined that the initial value SOCINT of the battery residual capacity SOC is larger than the discharge depth limit initial limit value #SOCINTL (when the capacity is high), the routing also goes to step S060.

In step S060, the lower limit threshold value SOCLMTL is set based on the initial value SOCINT of the battery residual capacity SOC and subsequently, the upper limit threshold value SOCLMTH is set in step S061 (refer to FIG. 4). The discharge depth limiting value #DODLMT, which determines the lower limit threshold value SOCLMT, corresponds, although depending upon the individual property of the battery 3, to approximately 10% of the battery residual capacity SOC, and the increasing value #SOCUP of the discharge depth limit release SOC, which determines the upper limit threshold value SOCLMTH, corresponds to 5% of the battery residual capacity SOC.

Accordingly, if the initial value SOCINT of the battery residual value is 55%, the lower limit threshold value SOCLMTL is set at 45%, and the upper limit threshold value SOCLMTH is set at 60%. When the initial value of the battery residual capacity is 40%, since, for example, 50% is assigned as the initial value of the battery residual capacity, the lower limit threshold value SOCLMTL is 40% and the upper limit threshold value SOCLMTH is 55%.

As shown above, when the initial value of the battery residual value SOC is less than the discharge depth limit initial value lower limit #SOCINTL, the depth to the lower limit threshold value SOCLIML can be small by raising the initial value by substituting the discharge depth limit initial value lower limit #SOCINTL to the initial value of the battery residual capacity SOC. Thus, when the initial value is less than the discharge depth limit initial value lower limit #SOCINTL, reduction of time until entering into the discharge depth limit control or immediate entering into the discharge depth limit control allows rapid restoration of the battery residual value SOC.

Subsequently, in step S062, the previous DOD limit judgement flag F_DODLMT is set to "0", and the previous setting of the discharge depth limit control mode is released.

When the start switch judgement flag F_STS is determined "0" in step S050, the battery residual value at present is judged in step S051 whether or not the battery residual capacity SOC at present is higher than the discharge depth limit executing upper limit SOCUPH. when the result is "YES", that is, when it is determined that the battery residual capacity SOC at present≧the discharge depth limit executing upper limit SOCUPH (when capacity is high), the routine goes to step S062. When the result in step S051 is "NO", that is, when it is determined that the battery residual capacity SOC at present<the discharge depth limit executing upper limit SOCUPH (when capacity is low), the routine goes to step S052. The value of, for example, 70% is set for the discharge depth limit executing upper limit SOCUPH.

In next step S052, the battery residual capacity SOC is judged whether or not it is less than the above-described SOCLMTL. When the result is "YES", that is, when it is determined that the battery residual value<the lower limit threshold value SOCLMTL (when the capacity is low), the DOT limit judgement flag F_DODLMT is set to "1" in step S054 for setting the discharge depth limit control mode. Thereby, as described later, various control operations related to the motor operation mode judgement such as an assist trigger judgement and control operations in the cruise mode are executed depending upon the state of the DOD limit judgement flag F_DODLMT.

Figure 4:
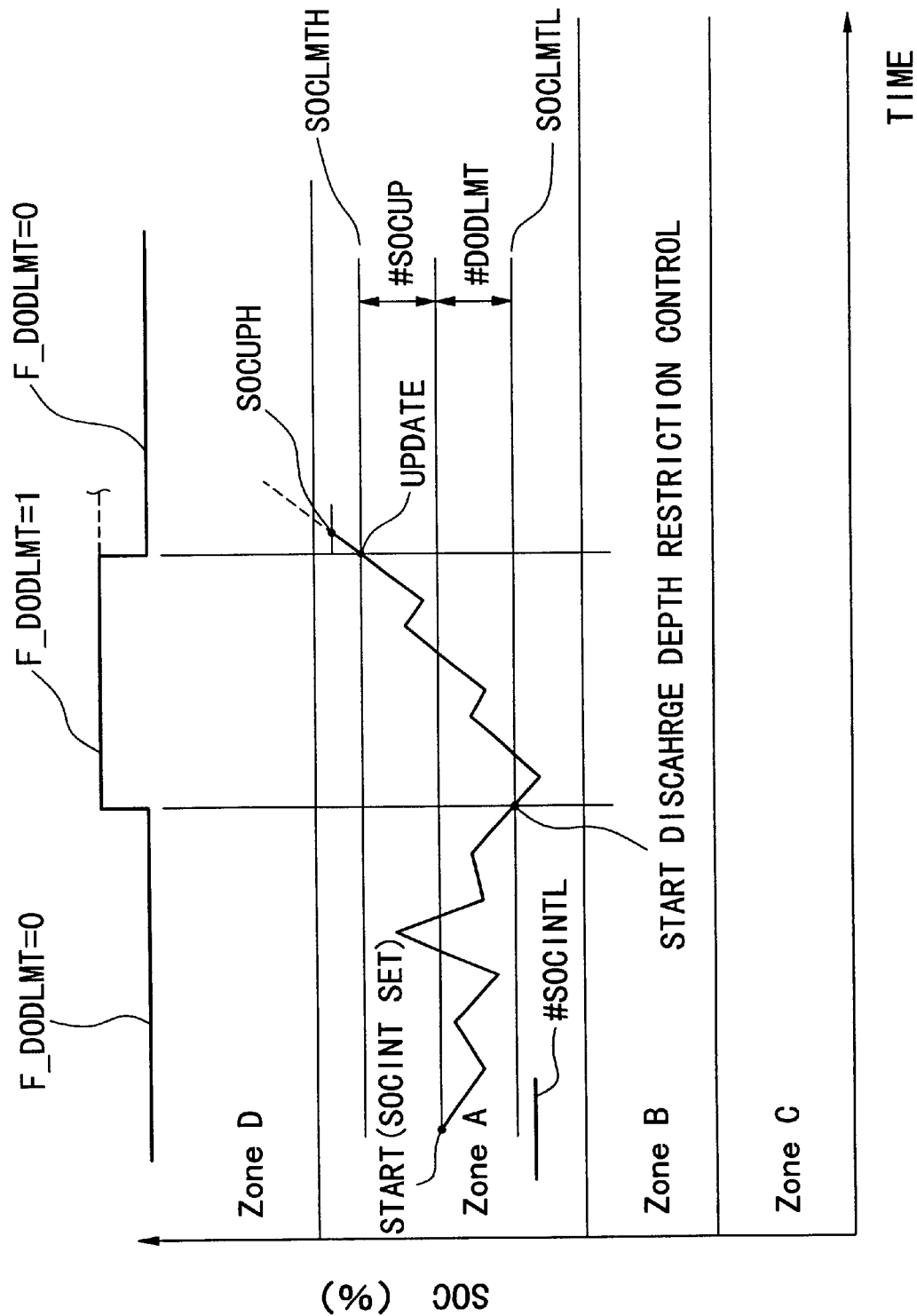
FIG. 4 is a graph showing SOC in the discharge depth limit control mode.

When the discharge depth limit control mode is entered, the power generation is carried out so as to increase the battery residual capacity SOC as shown in FIG. 4. When it is judged that the battery residual capacity SOC>the lower limit threshold value SOCLMTL, that is, the battery residual capacity SOC is higher than the lower limit threshold value SOCLMTL (when the capacity is high), the state of the DOD limit judgement flag F_DODLMT is judged.

When the result in step S053 is "1", that is, when it is judged that the discharge depth limit control mode has been set, a judgement is made whether or not the battery residual capacity SOC is higher than the upper limit threshold value SOCLMTL, that is, the battery residual capacity SOC>the upper limit threshold value SOCLMTH. In step S055, when it is determined that the battery residual capacity SOC>the upper limit threshold value SOCLMTH, that is the battery residual capacity SOC is higher than the upper limit threshold value SOCLMTH (when the capacity is high), the routine goes to step S057, the initial value SOCINT of the battery residual capacity SOC is updated and, following to this, the upper limit threshold value SOCLMTH and the lower limit threshold value SOCLMTL are updated. The increase of the battery residual capacity by this updating continues until the battery residual capacity reaches the discharge depth limit executing upper limit SOCUPH. Thus, it is possible to restore the battery residual capacity rapidly, and to prevent the battery from being excess charged.

When the value of the DOD limit judgement flag F_DODLMT is "0" in step S053, that is, when it is determined that setting of the discharge depth limit control mode is released, and when, in step S055, the battery residual capacity SOC≦the upper limit threshold value SOCLMTH, that is, when it is determined that the battery residual capacity SOC is less than the upper limit threshold value SOCLMTH (when the capacity is low), the control is completed.

As shown in step S051, although the operation is designed such that the discharge depth limit control is released when the battery residual capacity SOC at present≧the upper limit threshold value SOCLMTH (when the capacity is high), it may also be possible to release the discharge depth limit control when the battery residual capacity reaches the D zone.

Hereinafter, the practical content of the discharge depth limit control mode will be explained. Since the above-described discharge depth limit control mode is related to the "cruise mode" which is shown in step S024 in the motor operation mode identification shown in FIG. 2, and is also related to an "assist trigger judgement" described later, the discharge depth limit control mode will be described separately as to the cases of the cruise mode and the assist trigger judgement.

[Assist trigger judgement]

Figure 5:
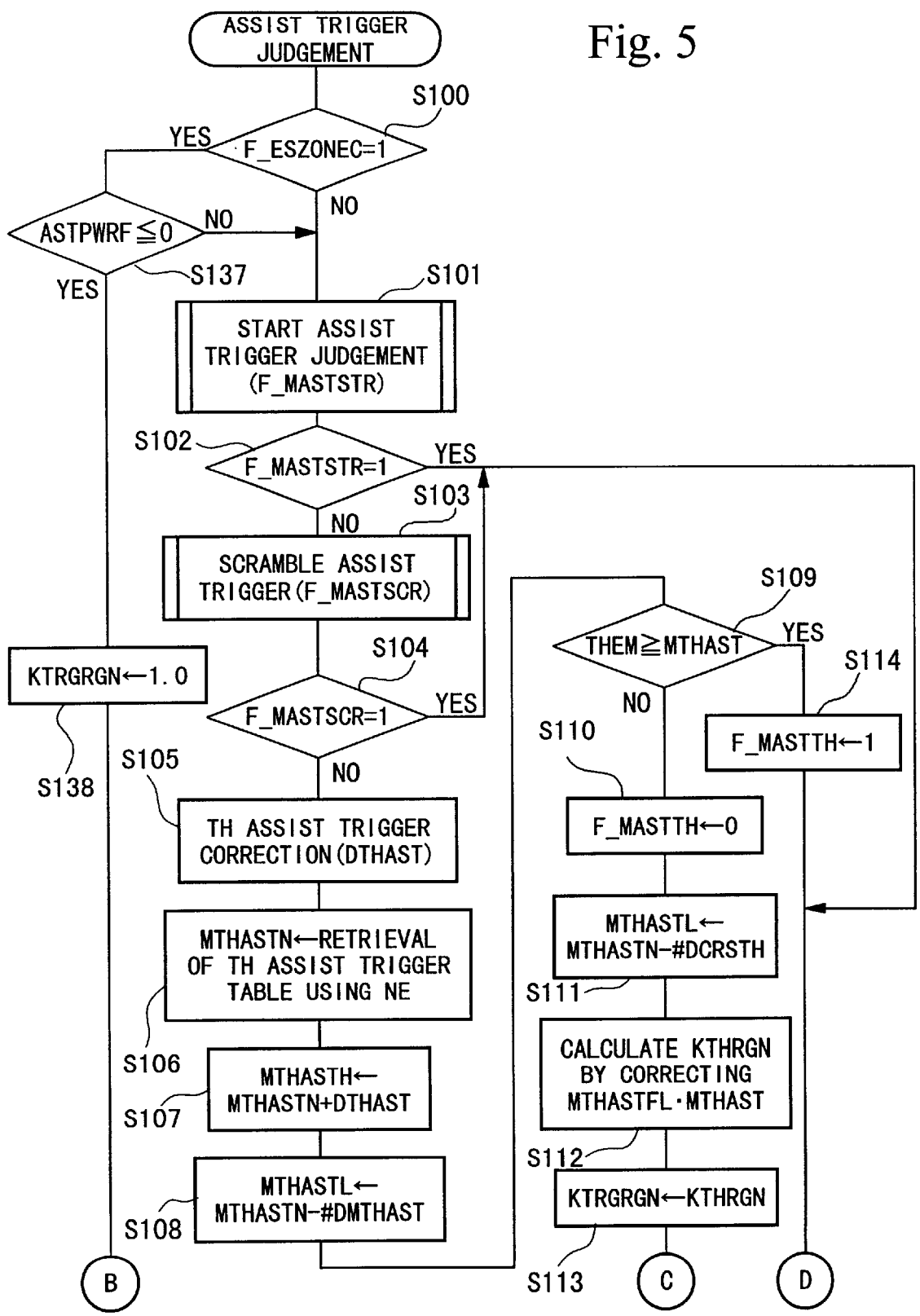
FIG. 5 shows a flow-chart for assist trigger judgement.
Figure 6:
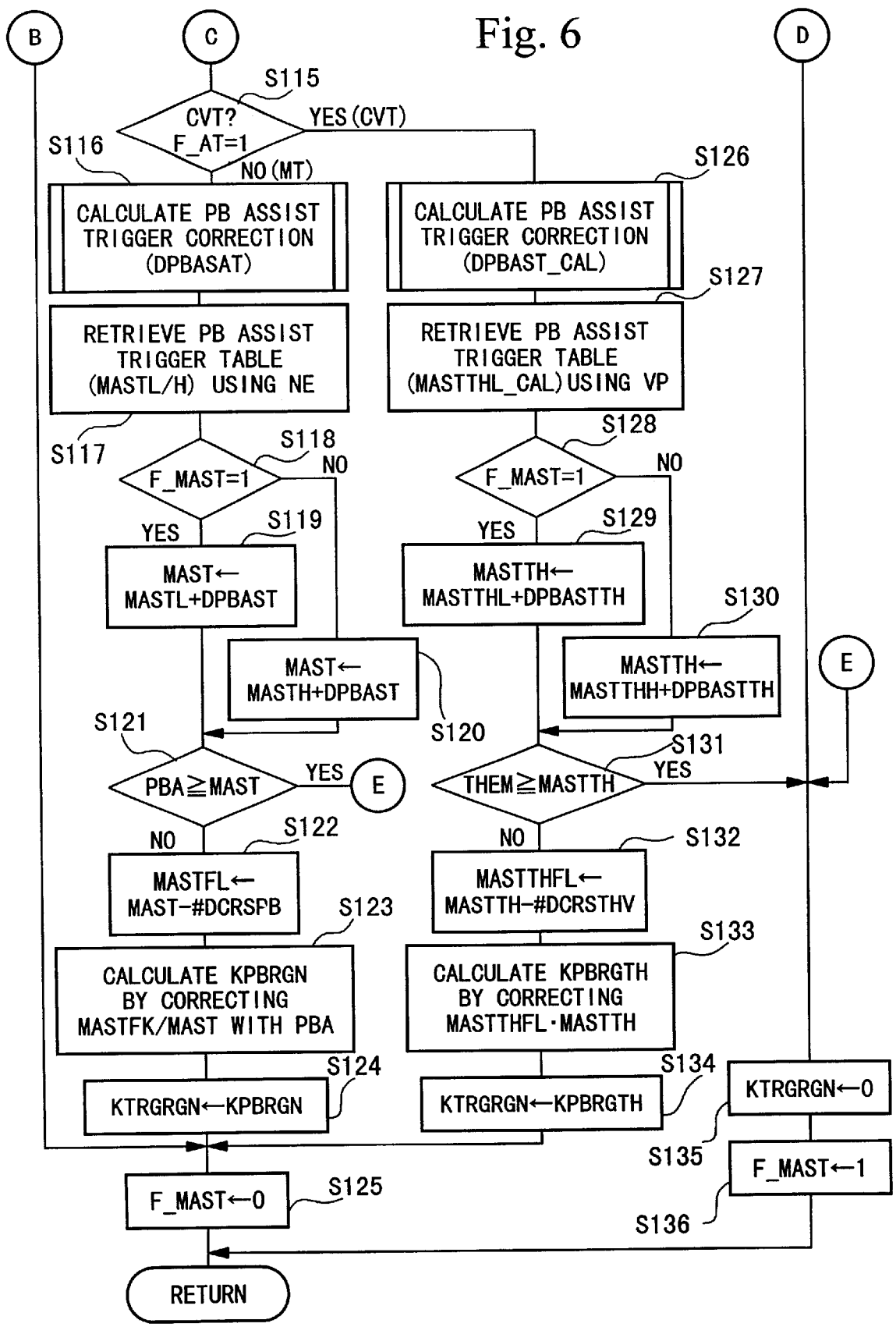
FIG. 6 shows a flow-chart for assist trigger judgement.

FIGS. 5 and 6 show flow-charts for assist trigger judgement, and more practically, flow-charts for judging the assist/cruise mode by the region.

A judgement is made in step S100 whether or not the energy storage zone C flag F_ESZONEC is "1". When the result is "YES", that is, when it is determined that the battery residual capacity SOC is in the C zone, a judgement is further made in step S137 whether or not the final assist order value ASTPWRF is less than 0. When the result in step S137 is "YES", that is, when it is determined that the final assist order value ASTPWRF is less than 0, then, in step S138, 1.0 is assigned into the cruise generation quantity subtraction factor KTRGRGN, and the routine is returned after substituing "0" into the motor assist judgement flag F_MAST in step S125.

If the results of judgement in steps S100 and S137 are "NO", a start trigger judgement is made in step S101. This start assist trigger process has an objective of improving the start performance of vehicles and is a process for calculating an assist trigger value and an assist amount in addition to the normal assist amount when a vehicle is going to start when the negative pressure PB at the suction pipe is higher than the normal negative pressure, and when it is judged that the start assist control, a start assist request flag F_MASTSTR is set to "1".

Subsequently, a judgement is made at step S102 whether or not the start assist request flag F_MASTSTR is "1", and when the flag value is "1", the routine goes to step S135 for getting off from the normal assist judgement for setting the cruise generation quantity subtraction factor KTRGRGN to "0", and the routine is returned after setting the motor assist judgement flag F_MAST to "1" at step S136.

When the result of the judgement in step S102 show that the start assist request flag F_MASTSTR value is not "1", then the routine goes to the scramble assist trigger judgement in step S103. This scramble assist trigger judgement process is a process for improving an acceleration sensation by temporarily increasing the assisting amount at the time of acceleration and it is defined in advance that, if the variation of the throttle is large, "1" is assigned to the flag value.

In the next step S104, a judgement is made whether or not the scramble assist trigger request flag F_MASTSCR, which is set in the judgement process of the scramble assist trigger, is "1", and when the result is "1", the routine goes to step S135 so as to get off from the assist trigger judgement process.

When the scramble assist request flag F_MASTSCR is not "1", a calculation is executed for computing the throttle assist trigger correction value DTHAST in the next step S105. This processing is described later.

Figure 7:
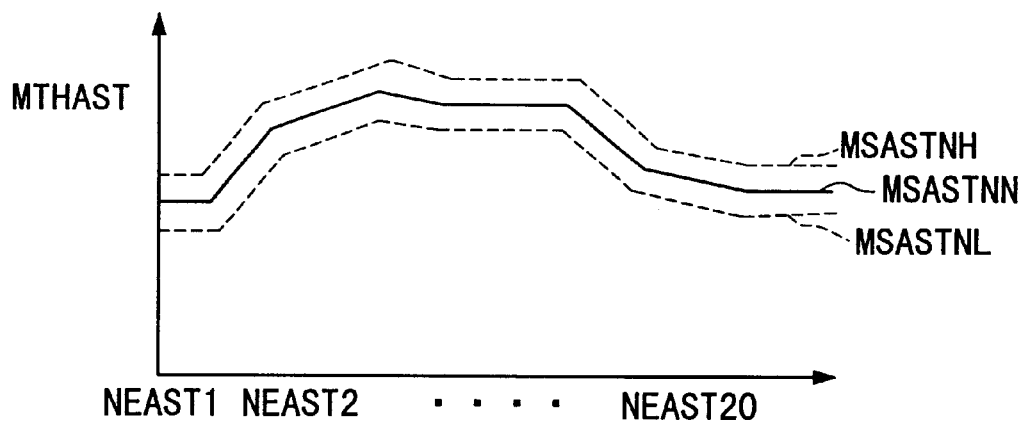
FIG. 7 is a graph showing threshold values of the TH assist mode and the PB assist mode.

In step S106, a threshold value MTHASTN, which constitutes a standard for a throttle assist trigger is retrieved from a throttle assist trigger table. This throttle assist trigger table, as shown by the solid line in FIG. 7, indicates the threshold value MTHASTN of the throttle openings, which constitutes a standard for judging whether or not the motor assist is executed, against the engine revolutions NE.

In next steps S107 and S108, a high throttle assist trigger threshold value is obtained by addition of the correction value DTHAST obtained in the above step S105 to the standard threshold value MTHASTN of the throttle assist trigger obtained in step S106, and a low throttle assist trigger value is obtained by subtracting a difference #DMTHAST for establishing a hysteresis from the high throttle assist trigger threshold values MTHASTH. When these high and low throttle assist trigger threshold values are recited superimposing the standard threshold value line MTHASTN in FIG. 7, these values form two broken lines.

Subsequently, in step S109, a judgement is made whether or not the throttle opening at present THEM is higher than the throttle assist trigger threshold value MTHAST, obtained in steps S107 and S108. This throttle assist trigger threshold values MTHAST are values having the above-described hysteresis, a high throttle assist trigger threshold value MTHASTH is referred to when the throttle opening is toward opening, and a low throttle assist trigger threshold value MTHASTL is referred to when the throttle opening is toward closing.

When the result in step S109 is "YES", that is, when the present value of the throttle opening THEM is higher than the throttle assist trigger threshold value MTHAST (threshold values having high and low hysteresis values), the routine goes to step S110, if the judgement in step S114 is "NO", that is, the present throttle opening THEM is not more than the throttle assist trigger threshold values MTHAST (threshold values having high and low hysteresis values).

In step S114, the throttle motor assist judgement flag F_MASTTH is set to "1", and in step S110, the throttle motor assist judgement flag F_MASTTH is set to "0".

The above processing is executed for making a judgement whether or not the throttle opening TH requests the motor assist, and, when it is judged that the present value THEM of the throttle opening is higher than the throttle assist trigger threshold value MTHAST, it is determined that the motor assist is requested by setting the throttle motor assist judgement flag F_MASTTH to "1" and by reading this flag at the time of the above described "acceleration mode".

In contrast, the fact that the throttle motor assist judgement flag F_MASTTH is set to "0" indicates that the motor assist judgement can not be made by the throttle opening. In this embodiment, it is defined to judge the assist trigger by use of both the throttle opening Th and the negative pressure at the engine suction pipe PB, so that the assist judgement is made by the throttle opening TH when the present value THEM of the throttle opening is higher than the throttle assist trigger threshold value MTHAST, and in the region where the present value THEM of the throttle opening does not exceed the above threshold value MTHAST, the judgement is made by the negative pressure at the engine suction pipe PB, which will be described later.

Figure 10:
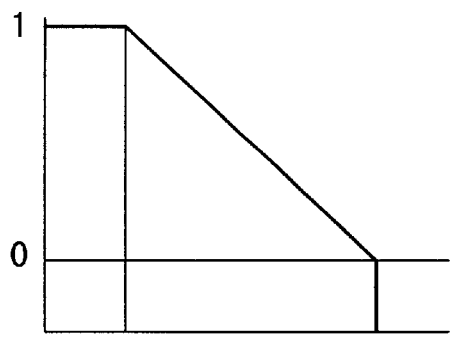
FIG. 10 shows a graph for obtaining the coefficients in step S113, step S124, and step S134.

Next, in step S111, a final throttle assist trigger lower limit threshold value MTHASTFL is obtained by subtracting a delta value (for example, 10 degree) of the predetermined throttle opening from the throttle assist trigger threshold value MTHAST. Subsequently, in step S112, cruise generation substraction factor table values KTHRGN are obtained by interpolation calculation of the final throttle assist trigger lower limit threshold value MTHASTFL and the throttle assist trigger threshold value MTHAST by use of the present value THEM of the throttle opening as shown in FIG. 10, and the cruise generation quantity subtraction table value KTHGRN is assigned in the cruise generation quantity subtraction factor KTRGRGN in step S113.

Subsequently, in step S115, a judgement is made whether or not the flag value of a MT/CVT judgement flag F_AT is "1". When the result is "NO", that is, the vehicle is a MT vehicle, the routine goes to S116. When the step S115 is "YES", that is, the vehicle is a CVT vehicle, the routine goes to step S126. In step S116, a computing processing is carried out for obtaining an suction pipe negative pressure assist trigger correction value DPBAST. The content of this processing is described later.

Figure 8:
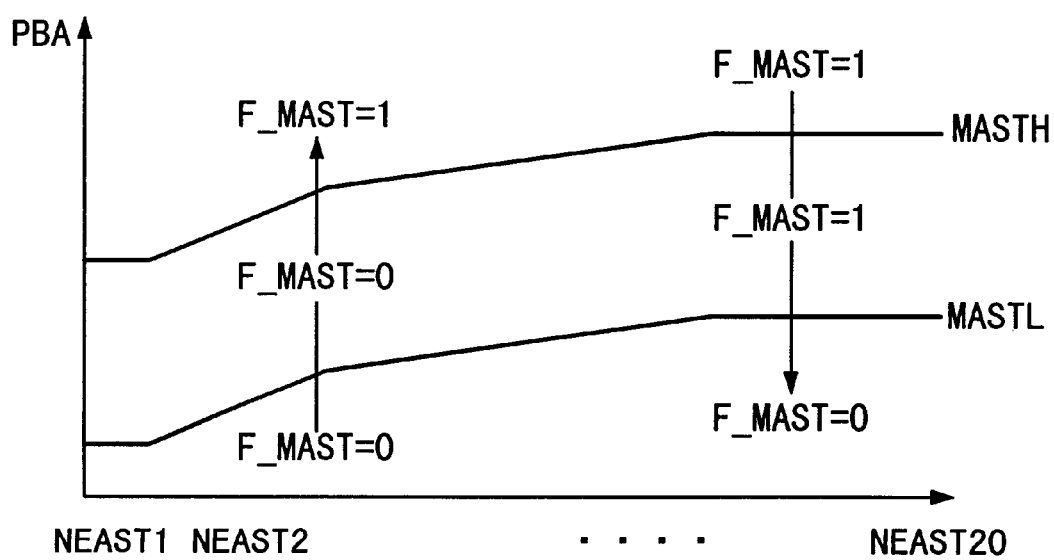
FIG. 8 is a graph showing the threshold value of the MT vehicle in the PB assist mode.

Subsequently, in step S117, a threshold MASTL/H of the suction pipe negative pressure assist trigger is retrieved from the suction pipe negative pressure assist trigger table. This suction pipe negative pressure assist trigger table defines, as shown by two solid lines in FIG. 8, a high suction pipe negative pressure assist trigger threshold value MASTH for judging whether or not it is necessary to execute a motor assist according to the engine speed NE, and a low suction pipe negative pressure assist trigger threshold value MASTL. In the retrieval processing in step S117, when the high threshold value MASTH line in FIG. 8 is crossed from the lower side to the upper side in response to the increase of the suction pipe negative charge PBA or in response to the decrease of the engine speed NE, setting of the motor assist judgement flag F_MAST is converted from "0" to "1", and when crossing the low threshold value MASTL in FIG. 8 from the upper to the lower in response to the decrease of the suction pipe negative charge PBA or in response to the increase of the engine speed NE, setting of the motor assist judgement flag F_MAST is converted from "1" to "0". Here, FIG. 8 is exchanged for respective gears or respective stoichiometric/lean burn conditions.

In the next step S118, it is judged whether or not the motor assist judgement flag is "1", and when the result is "1" the routine goes to step S119, and when the result is "0", the routine goes to step S120. In step S119, the suction pipe assist trigger threshold value MAST is obtained by addition of the corrected value DPBAST obtained in step S116 to the low threshold value MASTL of the suction pipe negative pressure assist trigger, which is obtained by retrieval in step S117, and in step S121, a judgement is made whether or not the present value PBA of the suction pipe negative pressure is higher than the suction pipe assist trigger threshold value MAST. If the result is "YES", the routine goes to step S135. When the result is "NO", the routine goes to step S122. In step S120, the suction pipe assist trigger threshold value MAST is obtained by addition of the corrected value DPBAST obtained in step S116 to the high threshold value MASTH of the suction pipe negative pressure assist trigger, which is obtained by retrieval in step S117. The routine then goes to step S121.

Figure 9:
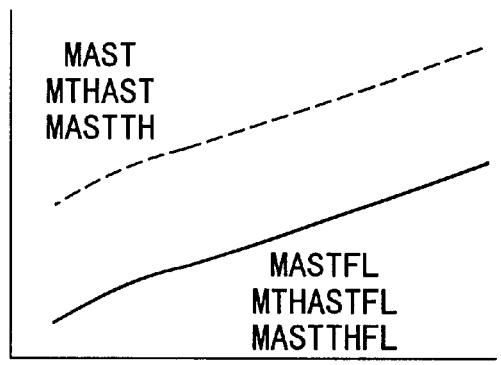
FIG. 9 shows a graph for obtaining the coefficients in step S113, step S124, and step S134.

In step S122, a final suction pipe negative pressure assist trigger lower limit threshold value MASTFL is obtained by subtracting a delta value #DCRSPB of the predetermined suction pipe negative pressure from the above-described suction pipe negative pressure assist trigger threshold value, as shown in FIG. 9. Subsequently, in step S123, the cruise generation quantity subtraction factor table value KPBRGN is obtained by interpolating the final suction pipe nagative pressure assist trigger lower limit threshold value MASTFL and the suction pipe negative pressure assist trigger threshold value MAST by the use of the present value PBA of the suction pipe negative pressure as shown in FIG. 10, and in step S124, the cruise generation quantity subtraction factor table value KPBRGN is assigned as the cruise generation quantity subtraction factor KTRGRGN. And, the routine returns after setting "0" in the motor assist judgement flag F_MAST in step S125.

In the above step S115, when the result is "YES", that is, when it is determined that the vehicle is the CVD vehicle, the routine goes to Step S126 to carry out processing for obtaining the suction pipe negative pressure assist trigger corrected value DPBASTTH. The detailed processing will be described later.

Figure 11:
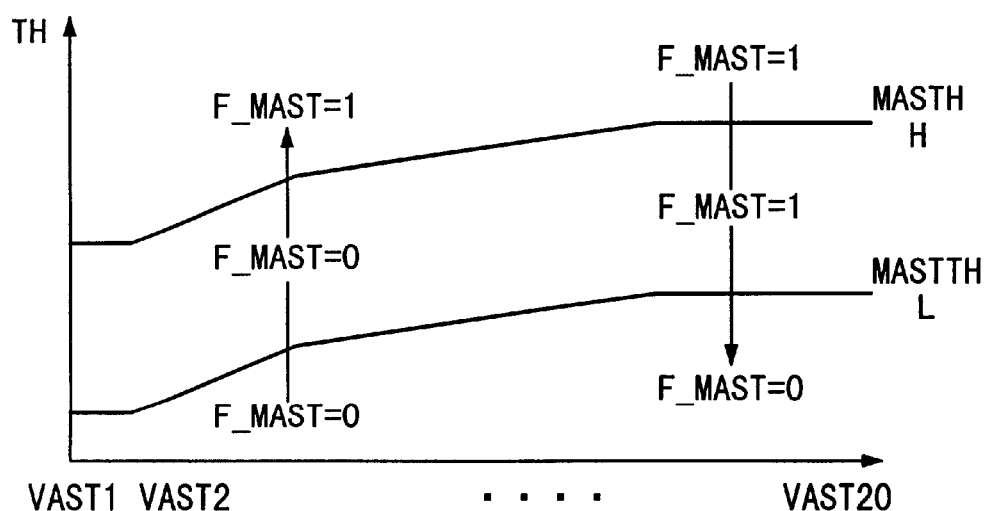
FIG. 11 shows a graph for obtaining the threshold value of the CVT vehicle in the PB assist mode.

Next, in step S127, a threshold value MATTHL/H of the suction pipe negative pressure assist trigger is retrieved from a suction pipe negative pressure assist trigger table. This suction pipe negative pressure assist trigger table determines, as shown by two solid lines in FIG. 11, the high suction pipe negative pressure assist trigger threshold value MASTTHH and the low suction pipe negative pressure assist trigger threshold value MASTTHL for the engine control vehicle speed VP. In the retrieval processing in step S127, when the high threshold value MASTTHH line is crossed from the lower side to the upper side in response to the increase of the degree of the throttle opening TH or in response to the decrease of the engine control speed VP, the motor assist judgement flag F_MAST is set from "0" to "1", and in contrast, when the low threshold value line MAST-THL is crossed from the upper side to the lower side in response to the decrease of the throttle openings TH or in response to the increase of the engine speed VP, setting of the motor assist judgement flag F_MAST is converted from"1" to "0". Here, FIG. 11 is exchanged for respective gears and for respective stoichiometric/lean burn conditions.

In the next step S128, a judgement is made whether or not the motor assist judgement flag F_MAST is "1", and when the result of the judgement is "1", the routine goes to step S129, and when the result is not "1", the routine goes to step S130. In step S129, the suction pipe assist trigger threshold value MASTTH is calculated by addition of the corrected value DPBASTTH obtained in step S126 to the low threshold value MASTTHL of the suction pipe negative pressure trigger, which is retrievably obtained in S127. In step S131, a judgement is made ehether or not the present value THEM of the throttle opening is higher than the suction pipe assist trigger threshold value MASTTH obtained in step S129. When the result is "YES", the routine goes to step S135, and when the result is "NO", the routine goes to step S135.

In step s130, the suction pipe assist trigger threshold value MASTTH is calculated by addition of the corrected value DPBATTH obtained in step S126 to the high thresuld value MASTTHH of the suction pipe negative pressure assist trigger, which is retrievably obtained in step S127, and the routine goes to step S131.

Subsequently, in step S132, the final suction pipe negative pressure assist trigger lowest threshold value MASTTH is calculated by subtracting the delta value #DCRSTHV of the predetermined throttle opening from above-described suction pipe negative pressure assist trigger threshold value MASTTH, as shown in FIG. 9. In step S133, the cruise generation quantity subtraction factor table value KPBRGTH is calculated by interpolating the final suction pipe negative pressure assist trigger lower limit threshold value MASTTHL and the suction pipe negative pressure assist trigger threshold value MASTTH by use of the present value THEM of the throttle opening, and the cruise generation quantity subtraction factor table value KPBRGTH is assigned to the cruise generation quantity subtraction factor KTRGRGN in step S134, and the routine is returned after assigning "0" to the motor assist judgement flag F_MAST.

[TH assist trigger correction]

Figure 12:
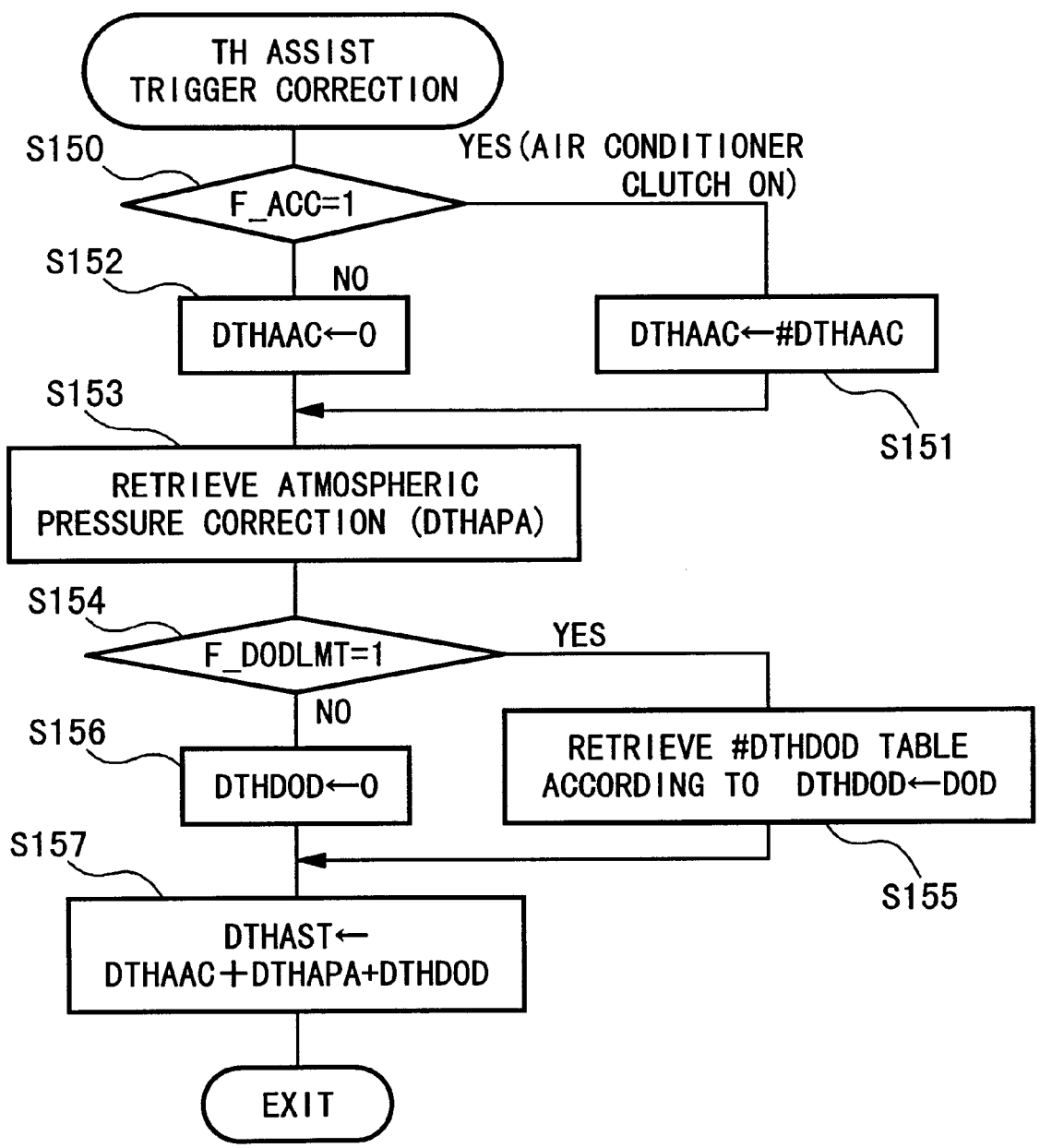
FIG. 12 shows a flow-chart for correcting the TH assist trigger.
Figure 13:
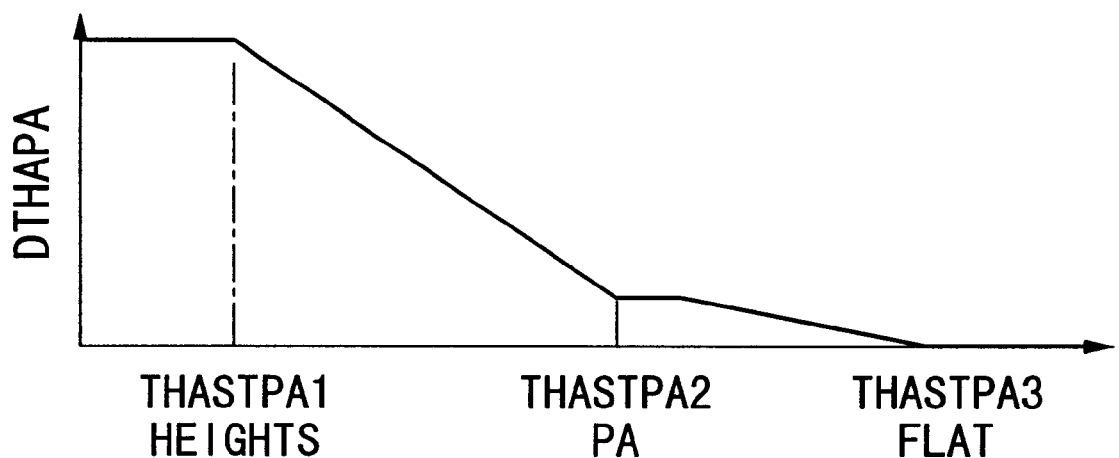
FIG. 13 is a graph showing an ambient pressure correction table.

FIG. 12 shows a flow chart for executing the throttle assist trigger correction in step S105.

In step S150, a judgement is made whether or not an air-conditioner ON flag F_SCC is "1". When the result is "YES, that is, when the air-conditioner is ON, the routine goes to step 151 for assigning a predetermined value DTHACC (for example, 20 degrees) for the air-conditioner correction value DTHACC and the routine further goes to step S153.

When the result in step S150 is "NO", that is, when the air conditioner is off, the routine goes to step S153 after assigning "0" to the air-conditioner correction value. The above processing raises the threshold value for the motor assist.

In step S153, a retrieval of the atmospheric pressure correction value (DTHAPA) in response to the atmospheric pressure is executed. In this correction, a correction value is retrieved from a throttle assist trigger PA correction table, which contains corrected values decreasing as the location moves from the heights to the flat. The atmospheric correction value DTHAPA is obtained by retrieval of the table.

Figure 14:
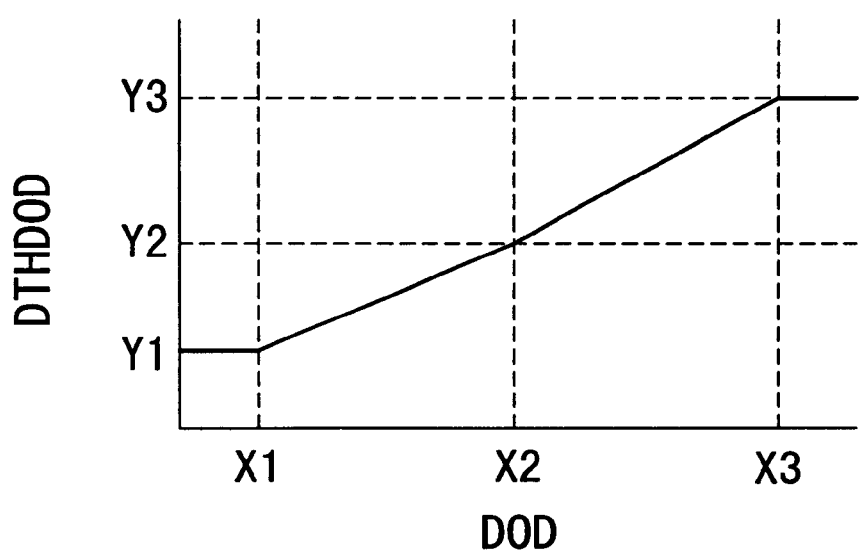
FIG. 14 is a graph showing a correction table of the discharge depth limit control.

In step S154, a judgement whether or not executing the limit processing for the battery discharge depth DOD is made by judging whether or not the DOD limit judgement flag is "1". When the discharge depth limit control mode is brought into practice, the DOD limit control mode correction value #DTHADOD, obtained by retrieving the table in step S155 based on FIG. 14, is assigned to the DOD limit control mode correction value DTHADOD.

The predetermined value #DTHADOD is set to the positive value in order to raise the judgement value for the motor assist, and when the control operation is in the discharge depth limit control mode, the correction value is used to prevent so as not to increase the frequency of the motor assist operation. Thus, since the frequency to enter into the assist operation can be prevented when the control operation is in the discharge depth limit control mode, the battery residual capacity can be restored rapidly.

Subsequently, in step S157, a throttle assist trigger correction value DTHAST is obtained by addition of the air conditioning correction value DTHACC obtained in step S151 or step S152, the atmospheric pressure correction value DTHAPA obtained in step S153, and the DOD limit control mode correction value DTHDOD; and the routine is returned.

[PB assist trigger correction (MT)]

Figure 15:
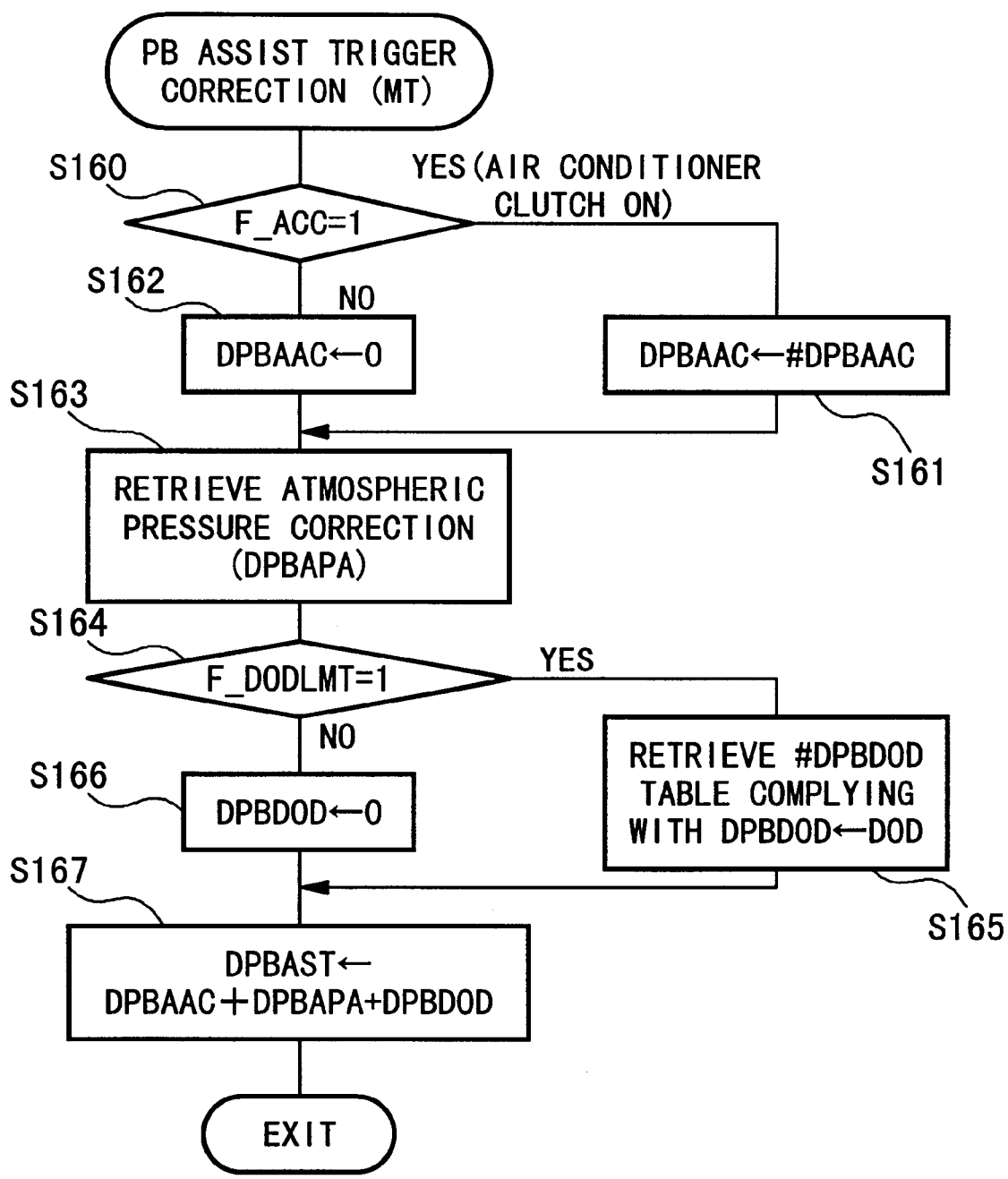
FIG. 15 shows a flow-chart for correcting the PB assist trigger (MT vehicle).
Figure 16:
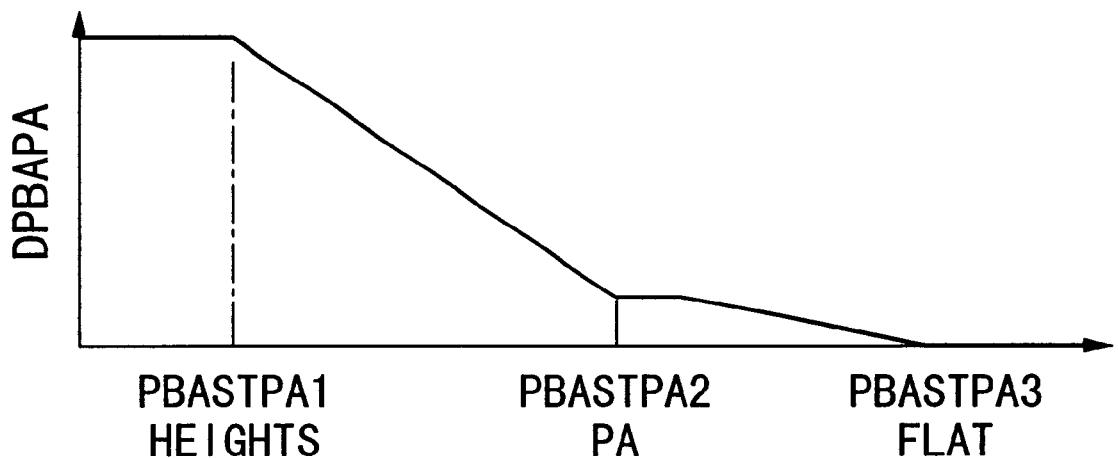
FIG. 16 is a graph showing a ambient correction table.

FIG. 15 shows a flow-chart of the suction pipe negative pressure throttle assist trigger correction in step S116.

In step S160, a judgement is made whether or not the air-conditioner ON flag F_ACC is "1". When the result is "YES", that is, when the air-conditioner is turned ON, the predetermined value #DPBAAC is assigned to the air conditioner correction value DPBAAC and the routine goes to step S163. When the result in step S160 is "NO", that is, when the air-conditioner is turned OFF, "0" is assigned to the air-conditioner correction value DPBAAC and the routine goes to step S163. Thereby, the threshold value of the motor assist is raised.

In step S163, the atmospheric pressure correction value (DPBAPA) in response to the atmospheric pressure is retrieved. This correction value is obtained by retrieving a table containing correction values which decrease as the location moves from the heights to the flat. By this table retrieval, the atmospheric pressure correction value DPBAPA is obtained.

Figure 17:
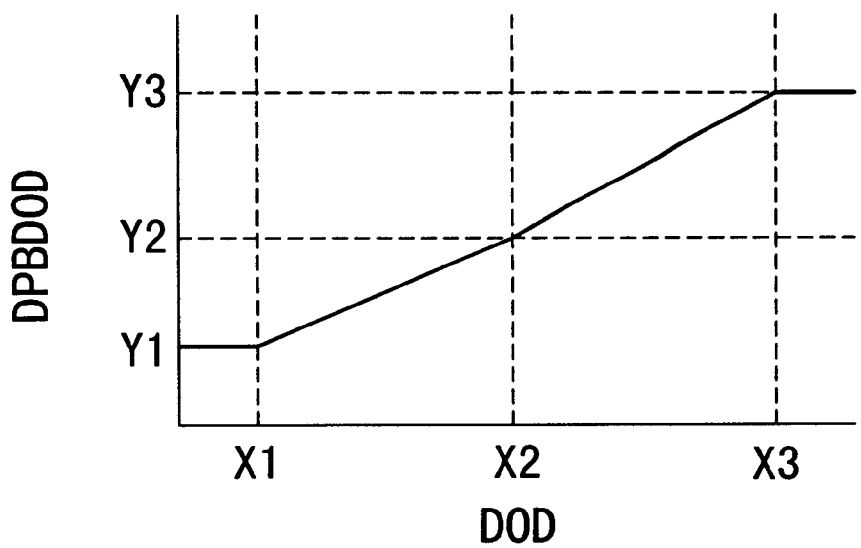
FIG. 17 is a graph showing the correction table of the discharge depth limit control.

Subsequently, in step S164, a judgement is made whether or not the limit processing is in practice for the battery discharge depth DOD by judging wheter of not the DOD limit judgement flag F_DODLMT is "1". When the discharge depth limit control mode is brought into practice, the DOD limit control correction value #DPBDOD is retrieved in step S165 based on FIG. 17, and the thus obtained value is assigned to the DOD limit control mode correction value DPBDOD.

In contrast, when the discharge depth limit control mode is released, 20" is assigned to the DOD limit control mode correction value DPBDOD after going to step S166.

In this case, a positive value is set as the predetermined value #DPBDOD in order to raise the judgement value for the motor assist, and when the control operation is in the discharge depth limit control mode, the predetermined value is set so as to reduce the frequency of the motor assist operation.

In the next step S167, a throttle assist trigger correction value DPBAST is obtained by addition of the air conditioner correction value DPBAAC obtained in steps 161 or 162, the atmospheric pressure correction valueDPBAPA obtained in step S163, and the DOD limit control mode correction value DPBDOD obtained in step S166, and the routine is returned. Thus, since the frequency to enter into the assist operation when the control operation is in the discharge depth limit control mode, the battery residual capacity can be restored rapidly.

[PB assist trigger correction]

Figure 18:
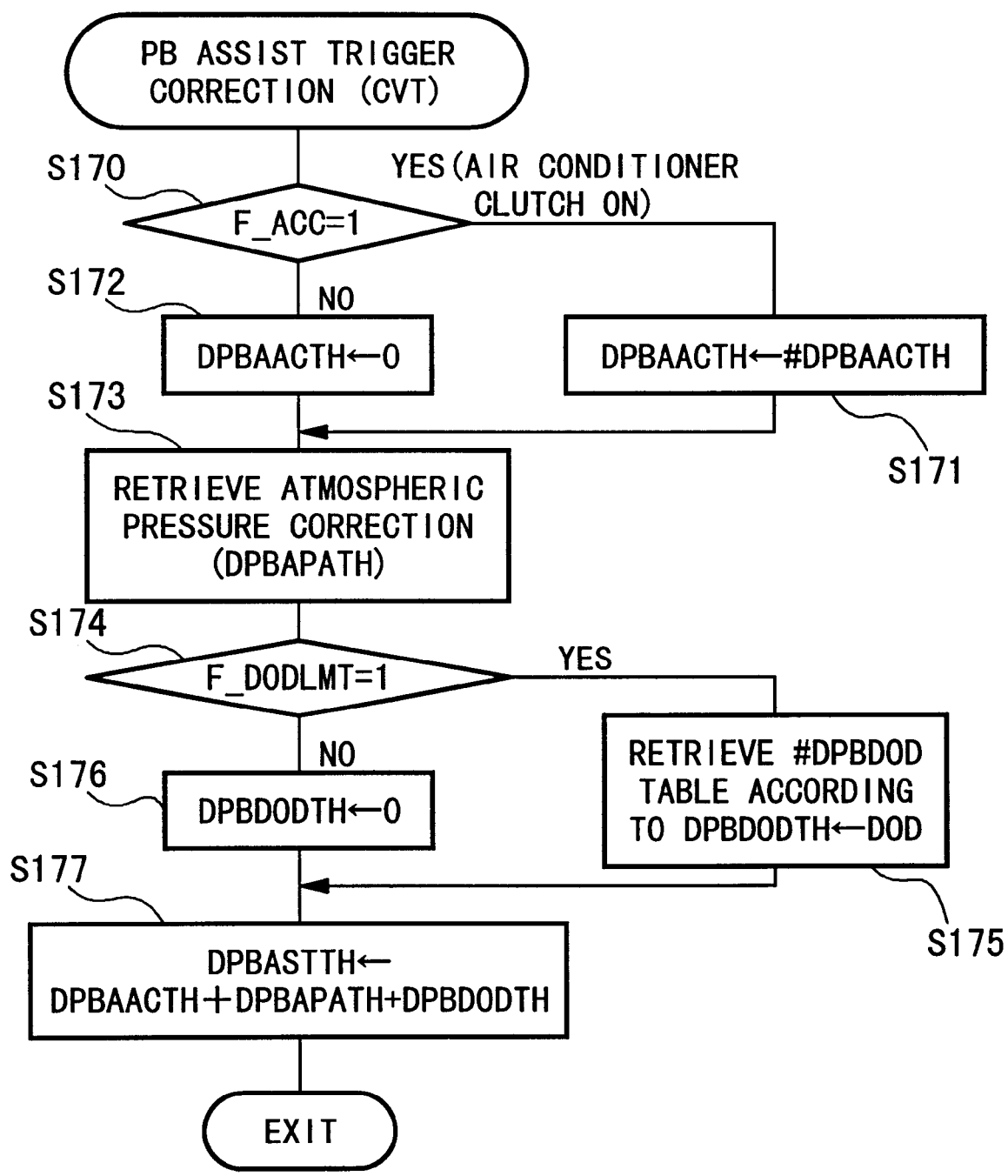
FIG. 18 shows a flow-chart for correcting the PB assist trigger (CVT vehicle).
Figure 19:
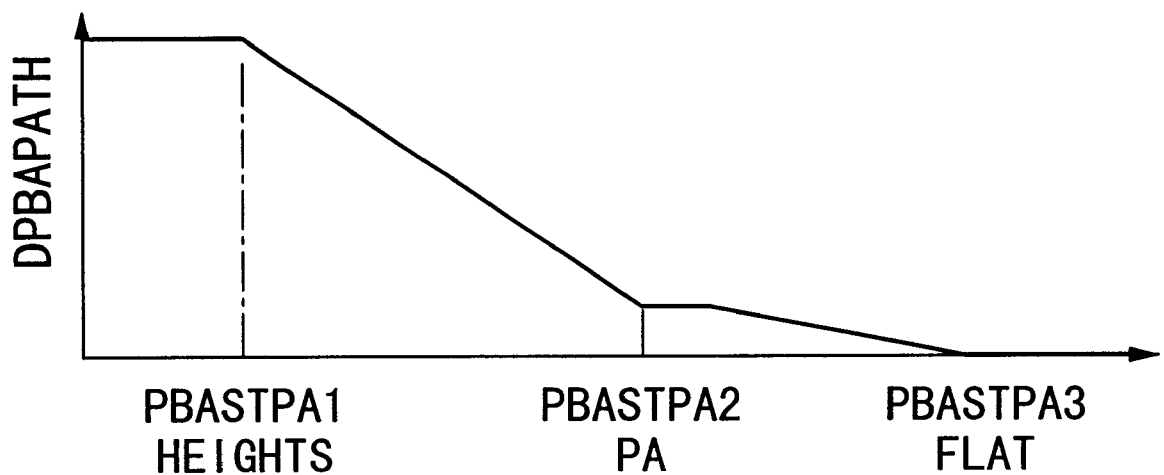
FIG. 19 is a graph showing the ambient pressure correction table.
Figure 20:
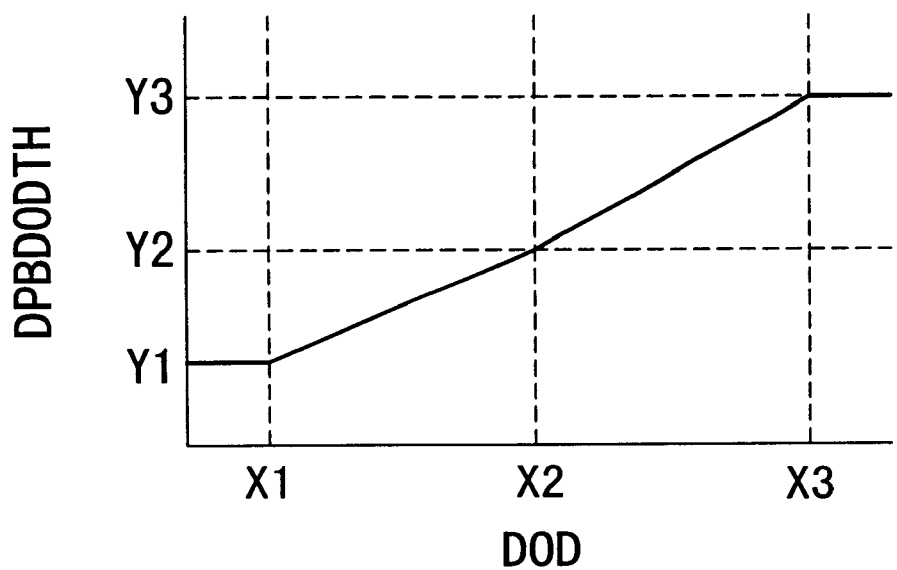
FIG. 20 is a graph showing the correction table of the discharge depth limit control.

FIG. 18 shows a flow-chart of the suction pipe neagative pressure throttle assist trigger correction executed in the step S126.

In step S170, a judgement is made whether or not the air-conditioner ON flag F_ACC is "1". When the result is "YES, that is, when the air-conditioner is turned ON, the routine goes to step S173 after assigning a predetermined value #DPBAACTH to the air-conditioning correction value in step S171.

If the result in step S170 is "NO", that is, the air-conditioner is turned OFF, the routine goes to step S173 after assigning "0" to the air-conditioner correction value DPBAACTH. Thereby, the threshold value for the moto assist is raised.

In step S173, the atmospheric pressure correction value (DPBAPATH) is retrieved in response to the atmospheric pressure. This correction value is retrieved from a table in which correction values are established so as to decrease as the location moves from the heights to the flat. The atmospheric pressure correction value DPBAPATH is thus obtained by such a table retrieval.

Next, in step S174, a judgement is made whether or not the limit processing for the battery discharge depth DOD is executed by whether or not the DOD limit judgement flag F_DODLMT is "1". When control operation is in the discharge depth limit control mode, the DOD limit control mode correction value #DPBDODTH is retrieved from a table as shown in Table 20, and the correction value #DPBDODTH is assigned to the DOD limit control mode correction value DPBDODTH.

In contrast, when the discharge depth limit control mode is released, the routine goes to step S176 and "0" is assigned to the DOD limit control mode correction value DPBDODTH.

In this case, a positive value is set for the predetermined value #DPBDODTH in order to raise the judgement value for the motor assist operation and in order to correct so as to reduce the frequency of the motor assist operation when the control operation is in the discharge depth limit control mode. Thus, since it is possible to to reduce the frequency of the motor assist operation when the control operation is in the discharge depth limit control mode, the battery residual value can be restored rapidly.

In the nest step S177, the throttle assist trigger correction value DPBASTTH is obtained by addition of the air-conditioner correction value DPBAACTH obtained in step 171, the atmospheric pressure correction value DPBAPATH obtained in step S173, and the DOD limit control mode correction value DPBDODTH obtained in step S176 and the routine is returned.

[Cruise mode]

Figure 21:
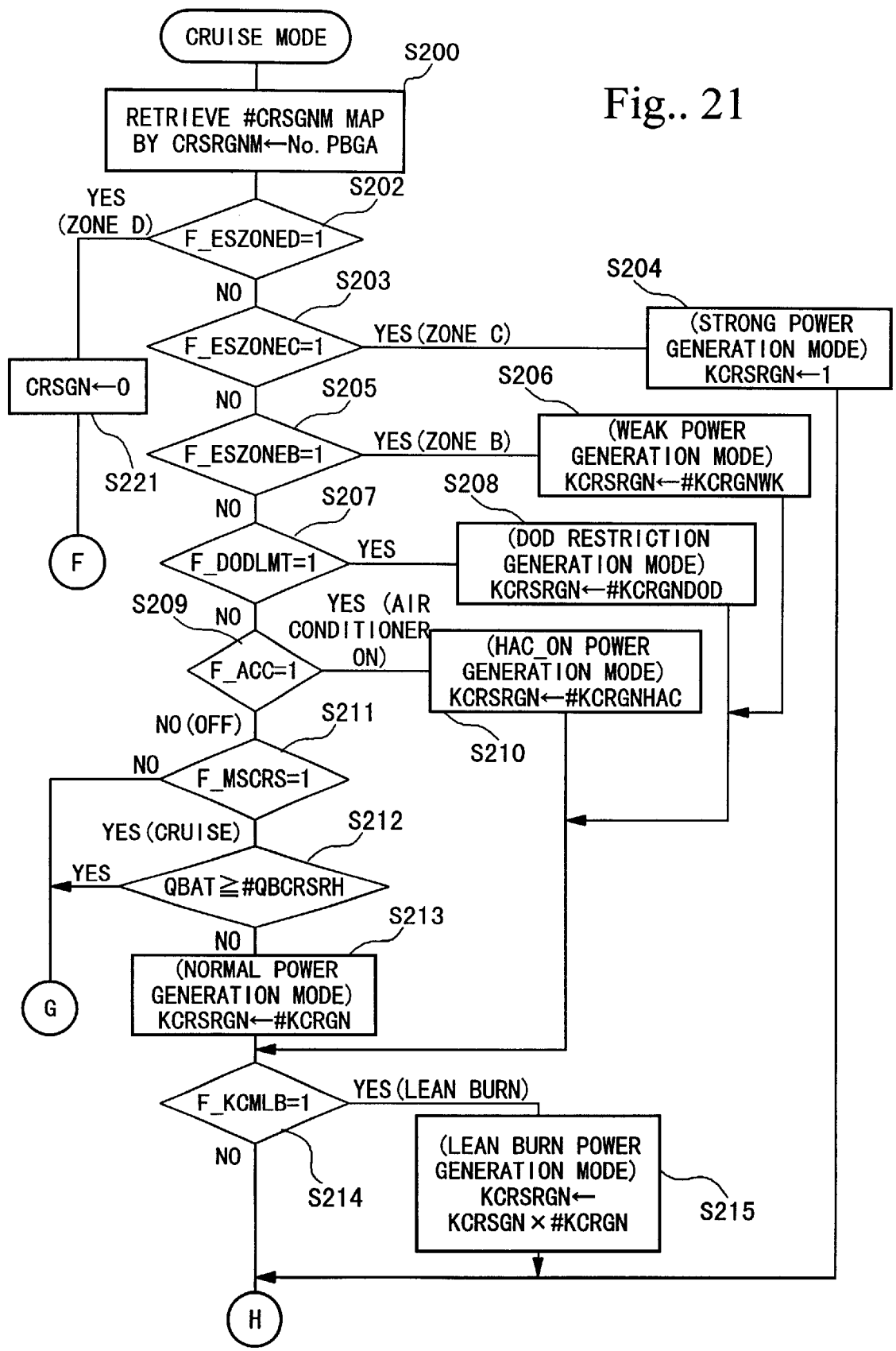
FIG. 21 shows a flow-chart in the closed mode.
Figure 22:
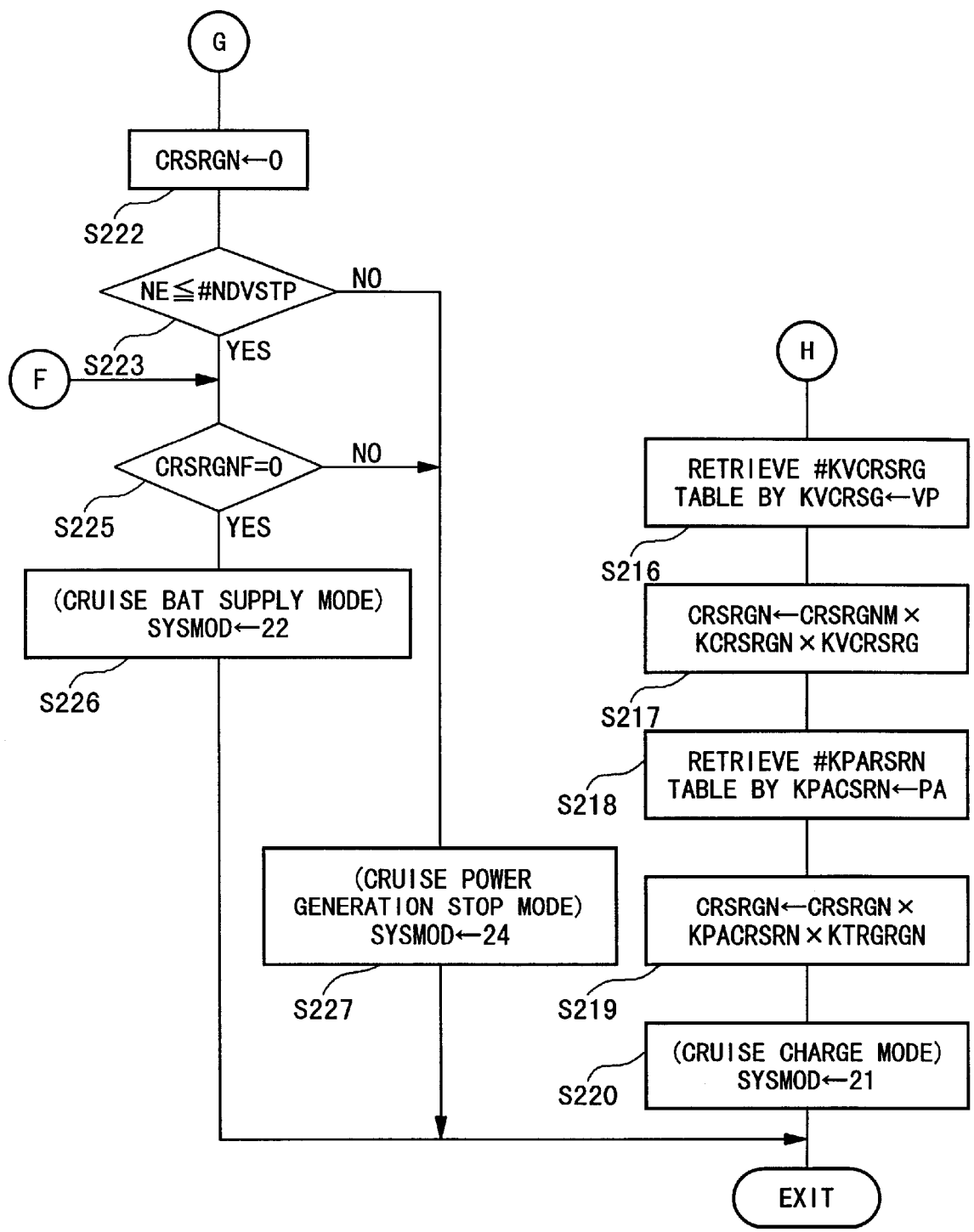
FIG. 22 shows a flow-chart in the closed mode.

FIGS. 21 and 22 show a flow-chart in the cruise mode, that is, practically, a flow-chart for calculating a target generation quantity at the time of cruising.

In step S200, a cruise generation quantity CRSRNM is retrieved from a map. This map shows generation quantities defined in response to the engine speed NE and the suction pipe negative pressure PBGA, and this map is exchanged for CVT and for MT.

In step S202, a judgement is made whether or not the energy storage zone D judgement flag F_ESZONED is "1". When the result is "YES", that is, when it is determined that the battery residual capacity SOC is in the D zone, the routine goes to step S225 after "0" is set to the cruise generation quantity in step S221. In step S225, a judgement is made whether or not the final cruise generation order value CRSRGN is "0". When the result in step S225 is not "0", the routine goes to step S227 and the control routine is completed after shifting to the cruise generation stop mode. When the result in Step S225 is "0", the routine goes to the step S226 and the control routine is completed after shifting to the cruise battery supply mode.

When the result in step S202 is "NO", that is, when it is determined that the battery residual capacity is not in the D zone, the routine goes to step S203 for making a judgement as to whether or not the energy storage zone C judgement flag F_ESZONEC is "1". When the result is "YES", that is, the battery residual capacity is in the C zone, the routine goes to step S204. When the result in step S203 is "NO", that is, the battery residual capacity is not in the C zone, the routine goes to step S205.

In step S205, a judgement is made as to whether or not the energy storage zone B judgement flag is "1". When the result is "YES", that is, when the battery residual capacity is in the B zone, the routine moves to step S206. In step S206, a cruise generation quantity factor #KCRGNWK (for the weak generation mode) is assigned to the correction factor of the cruise generation factor KCRSRGN and the routine goes to step S214.

In contrast, when the result in step S205 is "NO", that is, the battery residual capacity is not in the B zone, the routine goes to step S207, wherein a judgement is made as to whether or not the DOD limit judgement flag F_DODLMT is "1". When the result instep S207 is "YES", the routine goes to step S208, wherein a cruise generation quantity factor #KCRGNDOD (for DOD limited generation mode) is assigned in the correction factor of the cruise generation quantity KCRSRGN and the routine goes to step S214.

The increased generation quantity allows rapid restoration of the battery residual capacity. When the result in step S207 is "NO", the routine goes to step S209, and a judgement is made as to whether or not the air-conditioner ON flag F_ACC is "1". When the result is "YES", that is, when it is determined that the air-conditioner is turned ON, the routine goes to step S210, wherein a cruise generation quantity factor #KCRGNHAC (for HAC_ON generation) is assigned to the correction factor of the cruise generation quantity KCRSRGN and the routine goes to step S214.

When the reult in step S209 is "NO", that is, when it is determined that the air-conditioner is turned OFF, the routine goes to step S211, wherein a judgement is made as to whether or not the cruise mode judgement flag F_MACRS is "1". When the result in step 211 is "NO", that is, when it is determined that the operation is not in the cruise mode, the routine goes to step S233 after assigning "0" to the cruise generation quantity in step 222.

In step S223, a judgement is made as to whether or not the engine revolution NE is lower than the cruise battery supply mode execution upper limit engine revolution #NDVSTP. When the judgement result is "YES", that is, when it is determined that the engine revolution NE≦the cruise battery supply mode execution upper limit engine revolution #NDVSTP, the routine goes to step S225. When the result in step S223 is "NO", when it is determined that the engine revolution NE>the cruise battery supply mode execution upper limit engine revolution #NDVSTP, the routine goes to step S227. Here, the cruise battery supply mode execution upper limit engine revolution #NDVSTP is a value having hysteresis.

In step S212, a judgement is made as to whether or not the battery residual capacity QBAT (identical with SOC) is higher than a normal generation mode execution upper limit residual capacity #QBCRSRH. Here, the normal generation mode execution upper limit residual capacity #QBCRSRH is a value having hysteresis. When the result in step S212 is "YES", that is, when it is determined that the battery residual capacity QBAT≧a normal generation mode execution upper limit residual capacity #QBCRSRH, the routine goes to step S222. When it is determined that the battery residual capacity QBAT<a normal generation mode execution upper limit residual capacity #QBCRSRH, the routine goes to step S213, wherein a cruise generation quantity factor #KCRGN is assigned to the correction factor of the cruise generation quantity KCRSRGN, and further goes to step S214.

In step S214, a judgement is made as to whether or not the lean burn judgement flag F_KCMLB is "1". When the result is "YES", that is, when it is determined that the operation is executed under the lean burn condition, a value obtained by multiplying the correction factor of the cruise generation quantity KCRSRGN by a cruise generation quantity factor #KCRGNLB (for the lean burn generation mode) is assigned to the correction factor of the cruise generation quantity KCRSRGN, and the routine goes to step S216. When the result in step S214 is "NO", that is, when it is determined that the operation is not under the lean burn condition, the routine goes to step S216.

Figure 23:
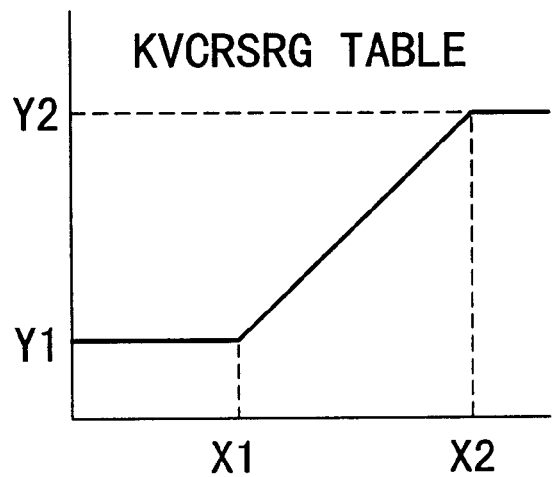
FIG. 23 shows a graph for obtaining a coefficient of the step S216.
Figure 24:
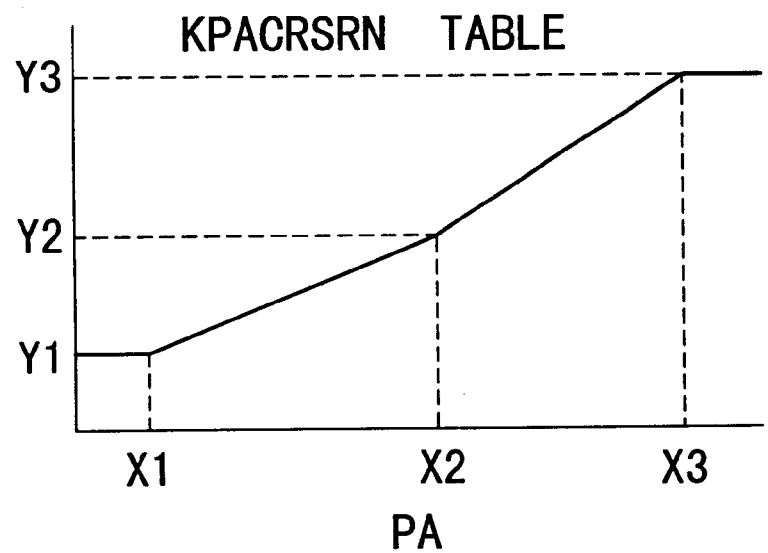
FIG. 24 shows a graph for obtaining a coefficient of the step S218.

In step S216, a cruise generation quantity substraction factor KVCRSRG shown in FIG. 23 is obtained by retrieval of the #KCCRSRG table from the engine speed VP. Subsequently, in step S217, a value obtained by multiplying the map value of the cruise generation quantity CRCRGNM by correction factor of the cruise generation KCRSRGN and the cruise generation quantity subtraction factor KVCRSRG is assigned to the cruise generation quantity. The routine then goes to step S218, a cruise generation quantity PA correction factor KPACRSRN is obtained by retrieval of the #KPACRSRN table.

In step S219, a cruise generation quantity is finally obtained by multiplying the cruise generation quantity CRSRGN by the cruise generation quantity PA correction factor KPACRSRN and the cruise generation quantity subtraction factor KTRGRGN and the operation is shift to the cruise generation mode in step S220.

As described above, the present invention according to the first aspect has an effect that it is possible to restore the residual capacity of the storage battery when the residual capacity of the storage battery is decreasing and when it is detected that the residual capacity of the storage battery decreased a predetermined amount. In addition, when the initial residual capacity of the storage battery is less than the lower limit of the initial residual capacity, since it is possible to raise the initial residual capacity and to reduce the discrepancy of the residual capacity from the lower limit threshold value by assigning the lower limit of the initial residual capacity to the initial residual capacity and since it becomes possible to change the control mode of the motor at an earlier timing, the residual capacity of the storage battery can be restored quickly when the residual capacity is small.

The present invention according to the second aspect has an effect that the residual capacity of the storage battery can be restored rapidly, even when the residual capacity of the storage battery is decreased to the lower limit threshold value because of the driving method of a particular driver or the travelling mode wherein sufficient regeneration is not obtainable. In addition, the present invention allows updating the upper limit threshold value and the lower limit threshold value by assigning the upper limit threshold value to the initial residual capacity, the residual capacity of the storage battery can be restored quickly.

The present invention according to the third aspect has an effect that, since it becomes possible to release the control mode of the motor quickly when the residual capacity of the storage battery has been restored, the excessive increase of the residual capacity can be prevented.

The present invention according to the fourth aspect has an effect that the residual capacity of the storage battery can be restored during the cruise mode by increasing the charging to the storage battery. In addition, according to the present invention, it becomes possible to restore the residual capacity of the storage battery by increasing the frequency of the power generation by raising the assist judgement threshold value.

What is claimed is:

1. A control apparatus for a hybrid vehicle comprising an engine for outputting a driving force of the vehicle, a motor for generating an auxiliary driving force for assisting the engine power in response to the driving condition of the vehicle, and a storage battery for storing a regenerative energy obtained by a regenerative operation of the motor at the time of supplying electric power to the motor or at the time of reducing speed of the vehicle; the control apparatus of the hybrid vehicle comprises:

a travel start detecting device for detecting a travel start of the vehicle;

a residual capacity detecting device for detecting a residual capacity of the storage battery;

an initial residual capacity comparison device for comparison of the initial residual capacity with the lower limit initial residual capacity;

a lower limit threshold value setting device for setting the lower limit threshold value of the discharge quantity for said initial residual capacity;

a lower limit threshold value setting device for setting the lower limit threshold value of the discharge quantity for said initial residual capacity;

an upper limit threshold value setting device for setting the upper limit threshold value of the discharge quantity for said initial residual capacity;

a motor control changing device for changing the control of said motor when the residual capacity of the storage battery reduces to said lower limit threshold value; and a mode setting release device for releasing the setting of the motor control mode changed by said motor control changing device when the residual capacity of the storage battery reaches said upper limit threshold value;

said control apparatus further comprises:

an initial residual capacity setting device for setting the initial value by assigning the lower limit initial residual value to the initial residual value when it is determined by said initial residual capacity comparison device that the initial residual capacity is lower than the lower limit threshold value.

2. A control apparatus of a hybrid vehicle according to claim 1, wherein said control apparatus further comprises an initial value updating device for updating the upper limit threshold value and the lower limit threshold value in response to the updating the initial residual capacity by the residual capacity detected by the residual capacity detecting device when the motor control mode is released by said mode setting release device.

3. A control apparatus of a hybrid vehicle according to claim 2, wherein the control apparatus further comprises an upper value comparison device for comparing the residual capacity of said storage battery with a discharge depth limiting execution upper limit, and the motor control mode is released by said mode setting release device when said upper value comparison device detects that the residual capacity of the storage battery is higher than the discharge depth limiting execution upper limit.

4. A control apparatus of a hybrid vehicle according to claim 1, wherein the change of the motor control in the case of decreasing the residual capacity of the storage battery to said lower limit threshold value corresponds to an increase of the charge quantity of the storage battery and to a change of the judgement threshold value for assisting the engine power by the motor.

5. A control apparatus of a hybrid vehicle according to claim 2, wherein the change of the motor control in the case of decreasing the residual capacity of the storage battery to said lower limit threshold value corresponds to an increase of the charge quantity of the storage battery and to a change of the judgement threshold value for assisting the engine power by the motor.

6. A control apparatus of a hybrid vehicle according to claim 3, wherein the change of the motor control in the case of decreasing the residual capacity of the storage battery to said lower limit threshold value corresponds to an increase of the charge quantity of the storage battery and to a change of the judgement threshold value for assisting the engine power by the motor.

* * * * *